US012604028B2

(12) United States Patent
Seo et al.

(10) Patent No.: US 12,604,028 B2
(45) Date of Patent: *Apr. 14, 2026

(54) METHOD FOR IMAGE DECODING/ENCODING, AND METHOD OF TRANSMITTING DATA FOR AN IMAGE

(71) Applicant: LG ELECTRONICS INC., Seoul (KR)

(72) Inventors: Jungdong Seo, Seoul (KR); Jaehyun Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/818,416

(22) Filed: Aug. 28, 2024

(65) Prior Publication Data

US 2024/0422344 A1     Dec. 19, 2024

Related U.S. Application Data

(63) Continuation of application No. 17/734,959, filed on May 2, 2022, now Pat. No. 12,096,020, which is a
(Continued)

(51) Int. Cl.
  *H04N 11/02*          (2006.01)
  *H04N 19/105*          (2014.01)
  (Continued)

(52) U.S. Cl.
  CPC ......... *H04N 19/513* (2014.11); *H04N 19/105* (2014.11); *H04N 19/109* (2014.11);
  (Continued)

(58) Field of Classification Search
  CPC .................................................. H04N 19/513
  (Continued)

(56) References Cited

U.S. PATENT DOCUMENTS

| | | | |
|---|---|---|---|
| 9,426,498 B2 * | 8/2016 | Zhang | H04N 21/234363 |
| 2013/0148734 A1 * | 6/2013 | Nakamura | H04N 19/182 |
| | | | 375/240.16 |

(Continued)

FOREIGN PATENT DOCUMENTS

| | | |
|---|---|---|
| CN | 102668562 A | 9/2012 |
| CN | 103891291 A | 6/2014 |

(Continued)

*Primary Examiner* — Leron Beck
(74) *Attorney, Agent, or Firm* — Bryan Cave Leighton Paisner LLP

(57) ABSTRACT

An image decoding method performed by a decoding device according to the present invention comprises the steps of: acquiring information on inter prediction of a target block through a bit stream; deriving motion information of the target block on the basis of the information on inter prediction; deriving a prediction sample by performing inter prediction for the target block on the basis of the motion information; generating a reconstruction block on the basis of the prediction sample; deriving modified motion information of the target block on the basis of the reconstruction block; and updating the motion information of the target block on the basis of the modified motion information. According to the present invention, modified motion information of the target block can be calculated, and the motion information of the target block can be updated on the basis of the modified motion information, so that the overall coding efficiency can be improved.

3 Claims, 13 Drawing Sheets

Related U.S. Application Data continuation of application No. 16/985,118, filed on Aug. 4, 2020, now Pat. No. 11,363,289, which is a continuation of application No. 16/465,895, filed as application No. PCT/KR2016/014167 on Dec. 5, 2016, now Pat. No. 10,764,598.

(51) Int. Cl.

| | |
|---|---|
| *H04N 19/109* | (2014.01) |
| *H04N 19/119* | (2014.01) |
| *H04N 19/13* | (2014.01) |
| *H04N 19/139* | (2014.01) |
| *H04N 19/172* | (2014.01) |
| *H04N 19/176* | (2014.01) |
| *H04N 19/44* | (2014.01) |
| *H04N 19/513* | (2014.01) |
| *H04N 19/91* | (2014.01) |

(52) U.S. Cl.
CPC ........... *H04N 19/119* (2014.11); *H04N 19/13* (2014.11); *H04N 19/139* (2014.11); *H04N 19/172* (2014.11); *H04N 19/176* (2014.11); *H04N 19/44* (2014.11); *H04N 19/91* (2014.11)

(58) Field of Classification Search
USPC ...................................... 375/240.01–240.29
See application file for complete search history.

(56) References Cited

U.S. PATENT DOCUMENTS

| | | | | |
|---|---|---|---|---|
| 2013/0188716 | A1* | 7/2013 | Seregin ................. | H04N 19/56 |
| | | | | 375/240.16 |
| 2013/0272404 | A1 | 10/2013 | Park et al. | |
| 2014/0044181 | A1 | 2/2014 | Siast et al. | |
| 2014/0092970 | A1* | 4/2014 | Misra .................... | H04N 19/52 |
| | | | | 375/240.16 |
| 2014/0146876 | A1 | 5/2014 | Takehara et al. | |
| 2014/0219357 | A1* | 8/2014 | Chuang ............... | H04N 19/593 |
| | | | | 375/240.16 |
| 2014/0233651 | A1* | 8/2014 | Nakamura ............ | H04N 19/70 |
| | | | | 375/240.16 |
| 2014/0253681 | A1* | 9/2014 | Zhang ................. | H04N 19/513 |
| | | | | 348/43 |
| 2014/0254686 | A1 | 9/2014 | Lim et al. | |
| 2014/0269916 | A1* | 9/2014 | Lim ...................... | H04N 19/52 |
| | | | | 375/240.15 |
| 2014/0294086 | A1 | 10/2014 | Oh et al. | |
| 2014/0301463 | A1* | 10/2014 | Rusanovskyy ........ | H04N 19/52 |
| | | | | 375/240.16 |
| 2014/0314147 | A1* | 10/2014 | Rusanovskyy ...... | H04N 19/503 |
| | | | | 375/240.12 |
| 2015/0163508 | A1 | 6/2015 | Bici et al. | |
| 2015/0195562 | A1* | 7/2015 | Li ....................... | H04N 19/109 |
| | | | | 375/240.16 |
| 2016/0105670 | A1 | 4/2016 | Pang et al. | |

FOREIGN PATENT DOCUMENTS

| | | | | |
|---|---|---|---|---|
| CN | 104539951 | A | 4/2015 | |
| CN | 105284117 | A | 1/2016 | |
| CN | 106101723 | A | 11/2016 | |
| JP | 2013-042240 | A | 2/2013 | |
| JP | 2013-102260 | A | 5/2013 | |
| KR | 10-2014-0136414 | A | 11/2014 | |
| KR | 10-1589725 | B1 | 1/2016 | |
| KR | 10-2572286 | B1 | 8/2023 | |
| WO | 2013-099285 | A1 | 7/2013 | |
| WO | 2013-099288 | A1 | 7/2013 | |
| WO | 2015-057039 | A1 | 4/2015 | |
| WO | WO-2017105097 | A1 * | 6/2017 | .......... H04N 19/513 |

* cited by examiner

Current picture

T-2    T-1    T0    T1    T2

Current picture

T-2    T-1    T0    T1    T2

| Merge Candidate List order |
| --- |
| A1 |
| B1 |
| B0 |
| A0 |
| B2 |
| T0 |
| T1 |
| Combined bi-predicted candidate |
| Zero Vector |

| Merge Candidate List order |
| --- |
| A1 |
| Updated A1 |
| B1 |
| Updated B1 |
| B0 |
| A0 |
| B2 |
| T0 |
| T1 |
| Combined bi-predicted candidate |
| Zero Vector |

| MVP Candidate List order |
| --- |
| MVP A |
| MVP B |
| MVP Col |
| MVP Zero |

| MVP Candidate List order |
|---|
| MVP A |
| Updated MVP A |
| MVP B |
| Updated MVP B |
| MVP Col |
| Updated MVP Col |
| MVP Zero |

METHOD FOR IMAGE DECODING/ENCODING, AND METHOD OF TRANSMITTING DATA FOR AN IMAGE

CROSS-REFERENCE TO RELATED APPLICATIONS

This application is a Continuation application of U.S. patent application Ser. No. 17/734,959, filed on May 2, 2022, now allowed, which is a Continuation application of U.S. patent application Ser. No. 16/985,118, filed on Aug. 4, 2020, now U.S. Pat. No. 11,363,289, issued on Jun. 14, 2022, which is a Continuation application of U.S. patent application Ser. No. 16/465,895, filed on Jun. 5, 2019, now U.S. Pat. No. 10,764,598, issued on Sep. 1, 2020, which is a National Stage of International Application No. PCT/KR2016/014167, filed on Dec. 5, 2016.

BACKGROUND OF THE INVENTION

Field of the Invention

The present invention relates to a technique for image coding and, more particularly, to a method and apparatus for decoding an image in an image coding system.

Related Art

Demand for high-resolution, high-quality images such as HD (High Definition) images and UHD (Ultra High Definition) images have been increasing in various fields. As the image data has high resolution and high quality, the amount of information or bits to be transmitted increases relative to the legacy image data. Therefore, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high resolution and high quality images.

SUMMARY OF THE INVENTION

The present invention provides a method and apparatus for improving image coding efficiency.

The present invention also provides a method and apparatus for an inter-prediction that updates motion information of a target block.

The present invention also provides a method and apparatus for calculating modified motion information of a target block after decoding procedure of the target block, and updating based on the modified motion information.

The present invention also provides a method and apparatus for using updated motion information of a target block for motion information of a next block neighboring the target block.

In an aspect, an image decoding method performed by a decoding apparatus is provided. The image decoding method includes obtaining an information on inter prediction of a target block through a bitstream, deriving motion information of the target block based on the information on the inter prediction, deriving a prediction sample by performing the inter prediction for the target block based on the motion information, generating a reconstructed block based on the prediction sample, deriving modified motion information for the target block based on the reconstructed block, and updating the motion information of the target block based on the modified motion information.

In another aspect, a decoding apparatus for performing an image decoding is provided. The decoding apparatus includes an entropy decoding unit configured to obtain information on inter prediction of a target block through a bitstream, a prediction unit configured to deriving motion information of the target block based on the information on the inter prediction, derive a prediction sample by performing the inter prediction for the target block based on the motion information, generate a reconstructed block of the target block based on the prediction sample and derive modified motion information for the target block based on the reconstructed block, and a memory configured to update the motion information of the target block based on the modified motion information.

In still another aspect, a video encoding method performed by an encoding apparatus is provided. The method includes generating motion information for a target block, deriving a prediction sample by performing inter prediction for the target block based on the motion information, generating a reconstructed block based on the prediction sample, generating modified motion information for the target block based on the reconstructed block, and updating the motion information of the target block based on the modified motion information.

In still another aspect, a video encoding apparatus is provided. The encoding apparatus includes a prediction unit configured to generate motion information for a target block, derive a prediction sample by performing inter prediction for the target block based on the motion information, generate a reconstructed block based on the prediction sample, and generate modified motion information for the target block based on the reconstructed block, and a memory configured to update the motion information of the target block based on the modified motion information.

According to the present invention, after decoding procedure of a target block, modified motion information of the target block is calculated, and can be updated to more accurate motion information, and through this, overall coding efficiency can be improved.

According to the present invention, motion information of a next block neighboring the target block can be derived based on the updated motion information of the target block, and propagation of distortion can be decreased, and through this, overall coding efficiency can be improved.

DESCRIPTION OF EXEMPLARY EMBODIMENTS

Figure 1:
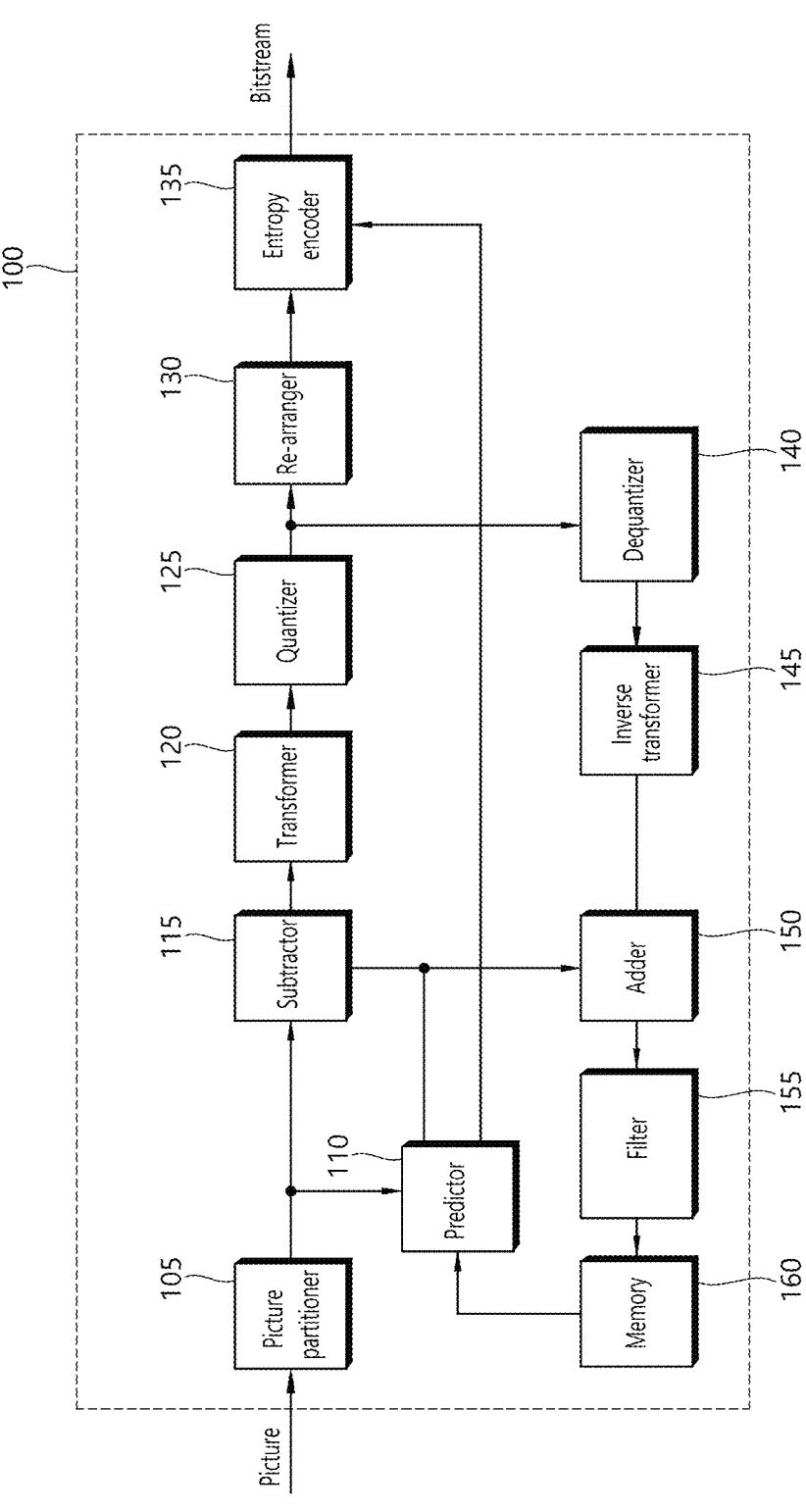
FIG. 1 is a schematic diagram illustrating a configuration of a video encoding device to which the present disclosure is applicable.

The present disclosure may be modified in various forms, and specific embodiments thereof will be described and illustrated in the drawings. However, the embodiments are not intended for limiting the disclosure. The terms used in the following description are used to merely describe specific embodiments, but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

On the other hand, elements in the drawings described in the disclosure are independently drawn for the purpose of convenience for explanation of different specific functions, and do not mean that the elements are embodied by independent hardware or independent software. For example, two or more elements of the elements may be combined to form a single element, or one element may be divided into plural elements. The embodiments in which the elements are combined and/or divided belong to the disclosure without departing from the concept of the disclosure.

Hereinafter, embodiments of the present disclosure will be described in detail with reference to the accompanying drawings. In addition, like reference numerals are used to indicate like elements throughout the drawings, and the same descriptions on the like elements will be omitted.

In the present specification, generally a picture means a unit representing an image at a specific time, a slice is a unit constituting a part of the picture. One picture may be composed of plural slices, and the terms of a picture and a slice may be mixed with each other as occasion demands.

A pixel or a pel may mean a minimum unit constituting one picture (or image). Further, a "sample" may be used as a term corresponding to a pixel. The sample may generally represent a pixel or a value of a pixel, may represent only a pixel (a pixel value) of a luma component, and may represent only a pixel (a pixel value) of a chroma component.

A unit indicates a basic unit of image procedureing. The unit may include at least one of a specific area and information related to the area. Optionally, the unit may be mixed with terms such as a block, an area, or the like. In a typical case, an M×N block may represent a set of samples or transform coefficients arranged in M columns and N rows.

FIG. 1 briefly illustrates a structure of a video encoding device to which the present disclosure is applicable.

Referring to FIG. 1, a video encoding device 100 includes a picture partitioner 105, a predictor 110, a subtractor 115, a transformer 120, a quantizer 125, a re-arranger 130, an entropy encoder 135, a dequantizer 140, an inverse transformer 145, an adder 150, a filter 255, and a memory 160.

The picture partitioner 105 may split an input picture into at least one procedureing unit. Here, a procedureing unit may be a coding unit (CU), a prediction unit (PU) or a transform unit (TU). The coding unit is a unit block of coding, and a largest coding unit (LCU) may be split into coding units of deeper depth according to a quad-tree structure. In this case, the largest coding unit may be used as a final coding unit or a coding unit may be recursively split into coding units of deeper depth as necessary and a coding unit having an optimal size may be used as a final coding unit based on coding efficiency according to video characteristics. When a smallest coding unit (SCU) is set, a coding unit cannot be split into a coding unit smaller than the smallest coding unit. Here, the final coding unit refers to a coding unit partitioned or split into a predictor or a transformer. A prediction unit is a block partitioned from a coding unit block and may be a unit block of sample prediction. Here, the prediction unit may be divided into sub blocks. A transform block can be split from a coding unit block according to the quad-tree structure and may be a unit block that derives a transform coefficient and/or a unit block that derives a residual signal from a transform coefficient.

Hereinafter, the coding unit may be called a coding block (CB), the prediction unit may be called a prediction block (PB), and the transform unit may be called a transform block (TB).

The prediction block or the prediction unit may mean a specific area having a block shape in a picture, and may include an array of a prediction sample. Further, the transform block or the transform unit may mean a specific area having a block shape in a picture, and may include a transform coefficient or an array of residual samples.

The predictor 110 may perform prediction on a procedureing target block (hereinafter, a current block), and may generate a prediction block including prediction samples for the current block. A unit of prediction performed in the predictor 110 may be a coding block, or may be a transform block, or may be a prediction block.

The predictor 110 may determine whether intra-prediction is applied or inter-prediction is applied to the current block. For example, the predictor 110 may determine whether the intra-prediction or the inter-prediction is applied in unit of CU.

In case of the intra-prediction, the predictor 110 may derive a prediction sample for the current block based on a reference sample outside the current block in a picture to which the current block belongs (hereinafter, a current picture). In this case, the predictor 110 may derive the prediction sample based on an average or interpolation of neighboring reference samples of the current block (case (i)), or may derive the prediction sample based on a reference sample existing in a specific (prediction) direction as to a prediction sample among the neighboring reference samples of the current block (case (ii)). The case (i) may be called a non-directional mode or a non-angular mode, and the case (ii) may be called a directional mode or an angular mode. In the intra-prediction, prediction modes may include as an example 33 directional modes and at least two non-directional modes. The non-directional modes may include DC mode and planar mode. The predictor 110 may determine the prediction mode to be applied to the current block by using the prediction mode applied to the neighboring block.

In case of the inter-prediction, the predictor 110 may derive the prediction sample for the current block based on a sample specified by a motion vector on a reference picture. The predictor 110 may derive the prediction sample for the current block by applying any one of a skip mode, a merge mode, and a motion vector prediction (MVP) mode. In case of the skip mode and the merge mode, the predictor 110 may use motion information of the neighboring block as motion information of the current block. In case of the skip mode, unlike in the merge mode, a difference (residual) between the prediction sample and an original sample is not transmitted. In case of the MVP mode, a motion vector of the neighboring block is used as a motion vector predictor and thus is used as a motion vector predictor of the current block to derive a motion vector of the current block.

In case of the inter-prediction, the neighboring block may include a spatial neighboring block existing in the current picture and a temporal neighboring block existing in the reference picture. The reference picture including the temporal neighboring block may also be called a collocated picture (colPic). Motion information may include the motion vector and a reference picture index. Information such as prediction mode information and motion information may be (entropy) encoded, and then output as a form of a bitstream.

When motion information of a temporal neighboring block is used in the skip mode and the merge mode, a highest picture in a reference picture list may be used as a reference picture. Reference pictures included in the reference picture list may be aligned based on a picture order count (POC) difference between a current picture and a corresponding reference picture. A POC corresponds to a display order and can be discriminated from a coding order.

The subtractor 115 generates a residual sample which is a difference between an original sample and a prediction sample, when the skip mode is applied, the residual sample may not be generated as described above.

The transformer 120 transforms residual samples in units of a transform block to generate a transform coefficient. The transformer 120 may perform transformation based on the size of a corresponding transform block and a prediction mode applied to a coding block or prediction block spatially overlapping with the transform block. For example, residual samples can be transformed using discrete sine transform (DST) when intra-prediction is applied to the coding block or the prediction block overlapping with the transform block and the transform block is a 4×4 residual array and is transformed using discrete cosine transform (DCT) in other cases.

The quantizer 125 may quantize the transform coefficients to generate a quantized transform coefficient.

The re-arranger 130 rearranges quantized transform coefficients. The re-arranger 130 may rearrange the quantized transform coefficients in the form of a block into a one-dimensional vector through a coefficient scanning method. Although the re-arranger 130 is described as a separate component, the re-arranger 130 may be a part of the quantizer 125.

The entropy encoder 135 may perform entropy-encoding on the quantized transform coefficients. The entropy encoding may include an encoding method, for example, an exponential Golomb, a context-adaptive variable length coding (CAVLC), a context-adaptive binary arithmetic coding (CABAC), or the like. The entropy encoder 135 may perform encoding together or separately on information (e.g., a syntax element value or the like) required for video reconstruction in addition to the quantized transform coefficients. The entropy-encoded information may be transmitted or stored in unit of a network abstraction layer (NAL) in a bitstream form.

The dequantizer 140 dequantizes values (transform coefficients) quantized by the quantizer 125 and the inverse transformer 145 inversely transforms values dequantized by the dequantizer 135 to generate a residual sample.

The adder 150 adds a residual sample to a prediction sample to reconstruct a picture. The residual sample may be added to the prediction sample in units of a block to generate a reconstructed block. Although the adder 150 is described as a separate component, the adder 150 may be a part of the predictor 110.

The filter 155 may apply deblocking filtering and/or a sample adaptive offset to the reconstructed picture. Artifacts at a block boundary in the reconstructed picture or distortion in quantization can be corrected through deblocking filtering and/or sample adaptive offset. Sample adaptive offset may be applied in units of a sample after deblocking filtering is completed. The filter 155 may apply an adaptive loop filter (ALF) to the reconstructed picture. The ALF may be applied to the reconstructed picture to which deblocking filtering and/or sample adaptive offset has been applied.

The memory 160 may store a reconstructed picture or information necessary for encoding/decoding. Here, the reconstructed picture may be the reconstructed picture filtered by the filter 155. The stored reconstructed picture may be used as a reference picture for (inter) prediction of other pictures. For example, the memory 160 may store (reference) pictures used for inter-prediction. Here, pictures used for inter-prediction may be designated according to a reference picture set or a reference picture list.

Figure 2:
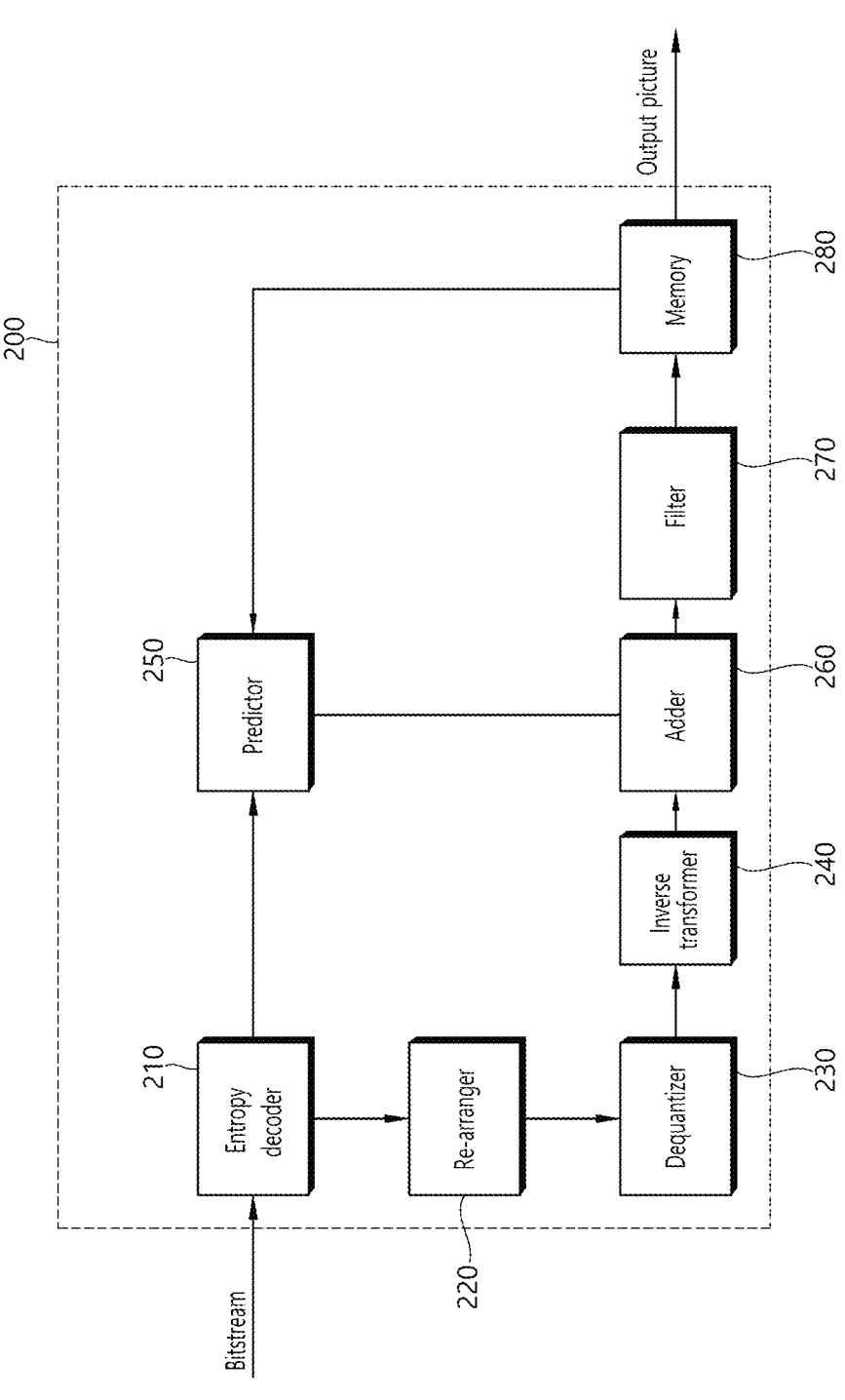
FIG. 2 is a schematic diagram illustrating a configuration of a video decoding device to which the present disclosure is applicable.

FIG. 2 briefly illustrates a structure of a video decoding device to which the present disclosure is applicable.

Referring to FIG. 2, a video decoding device 200 includes an entropy decoder 210, a re-arranger 220, a dequantizer 230, an inverse transformer 240, a predictor 250, an adder 260, a filter 270, and a memory 280.

When a bitstream including video information is input, the video decoding device 200 may reconstruct a video in association with a procedure by which video information is procedured in the video encoding device.

For example, the video decoding device 200 may perform video decoding by using a procedureing unit applied in the video encoding device. Therefore, the procedureing unit block of video decoding may be a coding unit block, a prediction unit block, or a transform unit block. As a unit block of decoding, the coding unit block may be split according to a quad tree structure from a largest coding unit block. As a block partitioned from the coding unit block, the prediction unit block may be a unit block of sample prediction. In this case, the prediction unit block may be divided into sub blocks. As a coding unit block, the transform unit block may be split according to the quad tree structure, and may be a unit block for deriving a transform coefficient or a unit block for deriving a residual signal from the transform coefficient.

The entropy decoder 210 may parse the bitstream to output information required for video reconstruction or picture reconstruction. For example, the entropy decoder 210 may decode information in the bitstream based on a coding method such as exponential Golomb encoding, CAVLC, CABAC, or the like, and may output a value of a syntax element required for video reconstruction and a quantized value of a transform coefficient regarding a residual.

More specifically, a CABAC entropy decoding method can receive a bin corresponding to each syntax element in a bitstream, determine a context model using decoding target syntax element information and decoding information of neighboring and decoding target blocks or information of amabol/bin decoded in a previous step, predict bin generation probability according to the determined context model and perform arithmetic decoding of the bin to generate a symbol corresponding to each syntax element value. Here, the CABAC entropy decoding method can update the context model using information of a symbol/bin decoded for a context model of the next symbol/bin after determination of the context model.

Information about prediction among information decoded in the entropy decoder 210 may be provided to the predictor 250 and residual values, that is, quantized transform coefficients, on which entropy decoding has been performed by the entropy decoder 210 may be input to the re-arranger 220.

The re-arranger 220 may rearrange the quantized transform coefficients into a two-dimensional block form. The re-arranger 220 may perform rearrangement corresponding to coefficient scanning performed by the encoding device. Although the re-arranger 220 is described as a separate component, the re-arranger 220 may be a part of the quantizer 230.

The dequantizer 230 may de-quantize the quantized transform coefficients based on a (de) quantization parameter to output a transform coefficient. In this case, information for deriving a quantization parameter may be signaled from the encoding device.

The inverse transformer 240 may inverse-transform the transform coefficients to derive residual samples.

The predictor 250 may perform prediction on a current block, and may generate a prediction block including prediction samples for the current block. A unit of prediction performed in the predictor 250 may be a coding block or may be a transform block or may be a prediction block.

The predictor 250 may determine whether to apply intra-prediction or inter-prediction based on information on a prediction. In this case, a unit for determining which one will be used between the intra-prediction and the inter-prediction may be different from a unit for generating a prediction sample. In addition, a unit for generating the prediction sample may also be different in the inter-prediction and the intra-prediction. For example, which one will be applied between the inter-prediction and the intra-prediction may be determined in unit of CU. Further, for example, in the inter-prediction, the prediction sample may be generated by determining the prediction mode in unit of PU, and in the intra-prediction, the prediction sample may be generated in unit of TU by determining the prediction mode in unit of PU.

In case of the intra-prediction, the predictor 250 may derive a prediction sample for a current block based on a neighboring reference sample in a current picture. The predictor 250 may derive the prediction sample for the current block by applying a directional mode or a non-directional mode based on the neighboring reference sample of the current block. In this case, a prediction mode to be applied to the current block may be determined by using an intra-prediction mode of a neighboring block.

In the case of inter-prediction, the predictor 250 may derive a prediction sample for a current block based on a sample specified in a reference picture according to a motion vector. The predictor 250 may derive the prediction sample for the current block using one of the skip mode, the merge mode and the MVP mode. Here, motion information required for inter-prediction of the current block provided by the video encoding device, for example, a motion vector and information about a reference picture index may be acquired or derived based on the information about prediction.

In the skip mode and the merge mode, motion information of a neighboring block may be used as motion information of the current block. Here, the neighboring block may include a spatial neighboring block and a temporal neighboring block.

The predictor 250 may construct a merge candidate list using motion information of available neighboring blocks and use information indicated by a merge index on the merge candidate list as a motion vector of the current block. The merge index may be signaled by the encoding device. Motion information may include a motion vector and a reference picture. When motion information of a temporal neighboring block is used in the skip mode and the merge mode, a highest picture in a reference picture list may be used as a reference picture.

In the case of the skip mode, a difference (residual) between a prediction sample and an original sample is not transmitted, distinguished from the merge mode.

In the case of the MVP mode, the motion vector of the current block may be derived using a motion vector of a neighboring block as a motion vector predictor. Here, the neighboring block may include a spatial neighboring block and a temporal neighboring block.

When the merge mode is applied, for example, a merge candidate list can be generated using a motion vector of a reconstructed spatial neighboring block and/or a motion vector corresponding to a Col block which is a temporal neighboring block. A motion vector of a candidate block selected from the merge candidate list is used as the motion vector of the current block in the merge mode. The aforementioned information about prediction may include a merge index indicating a candidate block having the best motion vector selected from candidate blocks included in the merge candidate list. Here, the predictor 250 may derive the motion vector of the current block using the merge index.

When the MVP (Motion vector Prediction) mode is applied as another example, a motion vector predictor candidate list may be generated using a motion vector of a reconstructed spatial neighboring block and/or a motion vector corresponding to a Col block which is a temporal neighboring block. That is, the motion vector of the reconstructed spatial neighboring block and/or the motion vector corresponding to the Col block which is the temporal neighboring block may be used as motion vector candidates. The aforementioned information about prediction may include a prediction motion vector index indicating the best motion vector selected from motion vector candidates included in the list. Here, the predictor 250 may select a prediction motion vector of the current block from the motion vector candidates included in the motion vector candidate list using the motion vector index. The predictor of the encoding device may obtain a motion vector difference (MVD) between the motion vector of the current block and a motion vector predictor, encode the MVD and output the encoded MVD in the form of a bitstream. That is, the MVD can be obtained by subtracting the motion vector predictor from the motion vector of the current block. Here, the predictor 250 may acquire a motion vector included in the information about prediction and derive the motion vector of the current block by adding the motion vector difference to the motion vector predictor. In addition, the predictor may obtain or derive a reference picture index indicating a reference picture from the aforementioned information about prediction.

The adder 260 can add a residual sample to a prediction sample to reconstruct a current block or a current picture. The adder 260 may reconstruct the current picture by adding the residual sample to the prediction sample in units of a block. When the skip mode is applied, a residual is not transmitted and thus the prediction sample may become a reconstructed sample. Although the adder 260 is described as a separate component, the adder 260 may be a part of the predictor 250.

The filter 270 may apply deblocking filtering, sample adaptive offset and/or ALF to the reconstructed picture. Here, sample adaptive offset may be applied in units of a sample after deblocking filtering. The ALF may be applied after deblocking filtering and/or application of sample adaptive offset.

The memory 280 may store a reconstructed picture or information necessary for decoding. Here, the reconstructed picture may be the reconstructed picture filtered by the filter 270. For example, the memory 280 may store pictures used for inter-prediction. Here, the pictures used for inter-prediction may be designated according to a reference picture set or a reference picture list. A reconstructed picture may be used as a reference picture for other pictures. The memory 280 may output reconstructed pictures in an output order.

As described above, in the case that an inter prediction is performed for a target block, motion information for the target block may be generated by applying a skip mode, a merge mode, or an adaptive motion vector prediction (AMVP) mode and encoded and outputted. In this case, in the motion information for the target block, a distortion may be calculated and included owing to the procedure of being encoded in the unit of block, and through this, the motion information that represents a reconstructed block of the target block may not be reflected perfectly. Particularly, in the case that the merge mode is applied to the target block, an accuracy of the motion information for the target block may be degraded. That is, there is big difference between a prediction block derived through the motion information for the target block and a reconstructed block of the target block. In this case, the motion information for the target block is used in a decoding procedure of a next block neighboring the target block, and a distortion may be propagated, and through this, overall coding efficiency may be degraded.

Accordingly, in the present invention, a method is proposed that modified motion information for the target block is calculated based on a derived reconstructed block after the decoding procedure of the target block, the motion information of the target block is updated based on the modified motion information such that a next block neighboring the target block may derive more accurate motion information. Through this, overall coding efficiency may be improved.

Figure 3:
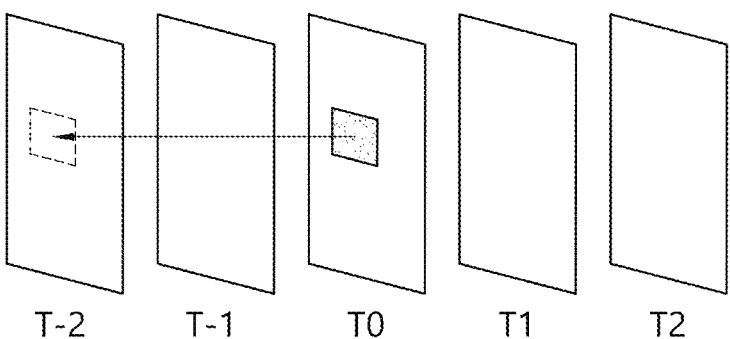
FIG. 3 illustrates an example of a case of performing an inter prediction based on uni-directional motion information and a case of performing an inter prediction based on bi-directional motion information which is applied to a target block.
Figure 3:
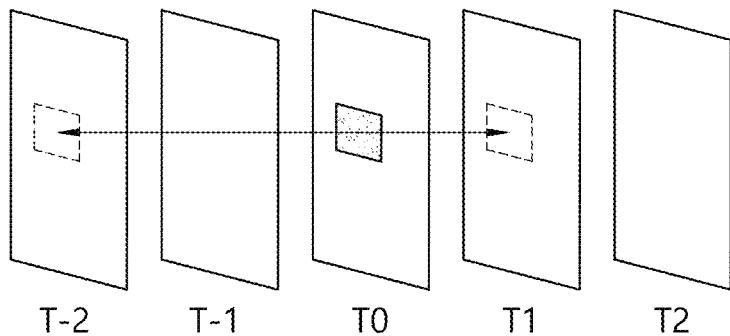

FIG. 3 illustrates an example of a case of performing an inter prediction based on uni-directional motion information and a case of performing an inter prediction based on bi-directional motion information which is applied to a target block. The bi-directional motion information may include L0 reference picture index and L0 motion vector, and L1 reference picture index and L1 motion vector, and the uni-directional motion information may include L0 reference picture index and L0 motion vector or L1 reference picture index and L1 motion vector. The L0 indicates reference picture list L0 (list 0) and the L1 indicates reference picture list L1 (list 1). In the image coding procedure, a method used for the inter prediction may include derivation of the motion information by a motion estimation and a motion compensation. As shown in FIG. 3, the motion estimation may be indicated in the procedure of deriving a block matched to the target block targeted to reference pictures which is encoded before encoding of the target picture in which the target block is included. The block matched to the target block may be defined as a reference block, and a position difference between the target block derived by assuming that the reference block is included in the target picture which is the same as the target block and the reference block may be defined as a motion vector of the target block. The motion compensation may include a uni-directional method in which one reference block is derived and used and a bi-directional method in which two reference blocks are derived and used.

The information including information for the motion vector for the target block and the reference picture may be defined as motion information of the target block. The information for the reference picture may include a reference picture list and a reference picture index that indicates a reference picture included in the reference picture list. An encoding apparatus may store the motion information for the target block for a next block neighboring the target block to be encoded next to the target block after the target block is encoded or pictures to be encoded next to the target picture. The stored motion information may be used in a method for representing the motion information of the next block to be encoded next to the target block or the pictures to be encoded nest to the target block. The method may include the merge mode which is a method of indexing the motion information of the target block and transmitting the motion information of the next block neighboring the target block as an index and the AMVP mode which is a method of representing the motion vector of the next block neighboring the target block only with a differential between the motion vector of the next block and the motion vector of the target block.

The present invention proposes a method for updating the motion information for the target picture or the target block after the encoding procedure of the target picture or the target block. When an inter prediction is performed and encoded for the target block, the motion information used in the inter prediction may be stored. However, the motion information may include a distortion occurred during the procedure of being calculated through the block matching method, and since the motion information may be a value selected through the rate-distortion (RD) optimization procedure for the target block, it may be difficult in reflecting an actual motion of the target block perfectly. Since the motion information of the target block may used not only in the inter prediction procedure of the target block but also influences on the picture which is encoded after encoding of the target picture including the next block neighboring the target block encoded after encoding of the target block and the target picture including the next block and the target block, overall coding efficiency may be degraded.

Figure 4:
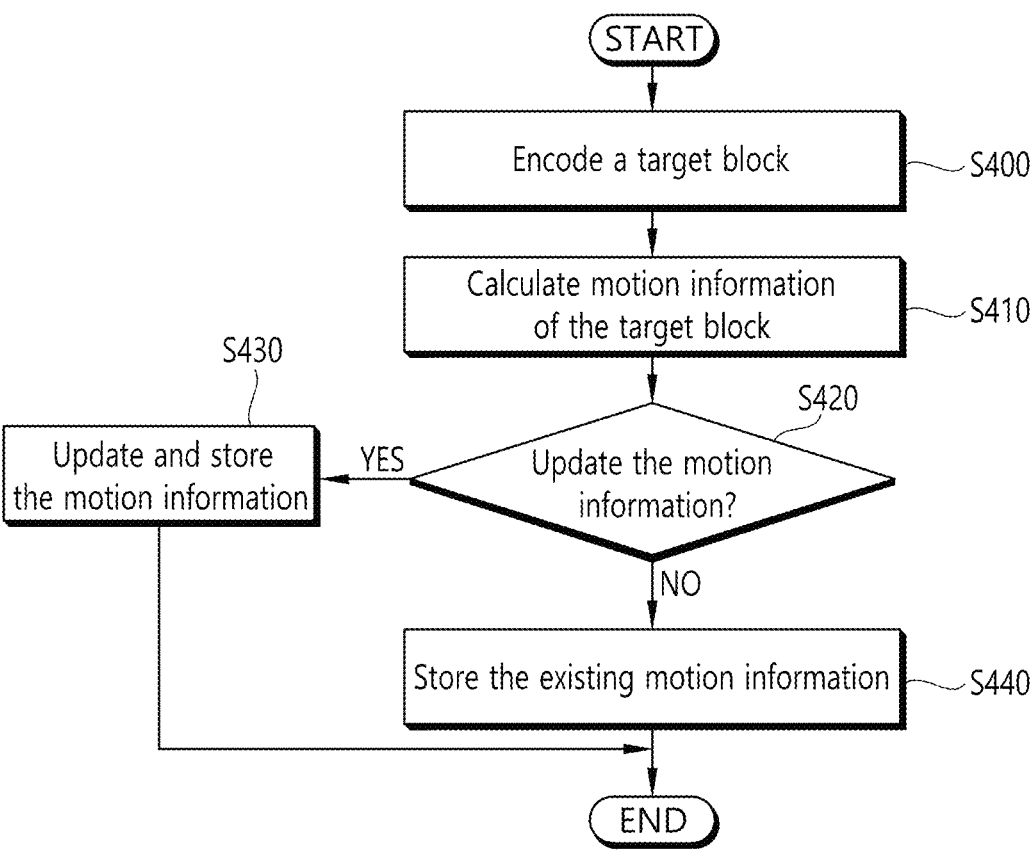
FIG. 4 illustrates an example of an encoding procedure including a method of updating the motion information of a target block.

FIG. 4 illustrates an example of an encoding procedure including a method of updating the motion information of a target block. An encoding apparatus encodes a target block (step, S400). The encoding apparatus may derive a prediction sample by performing an inter prediction for the target block and generate a reconstructed block of the target block based on the prediction sample. The encoding apparatus may derive the motion information of the target block for performing the inter prediction and generate the information for the inter prediction of the target block including the motion information. The motion information may be referred to as first motion information.

After performing the encoding procedure of the target block, the encoding apparatus calculates motion information modified based on the reconstructed block of the target block (step, S410). The encoding apparatus may calculate the modified motion information of the target block through various methods. The modified motion information may be referred to as second motion information. At least one method including direct methods such as an optical flow (OF) method, a block-matching method, a frequency domain method, and the like and indirect methods such as a singularity matching method, a method using a statistical property, and the like may be applied to the method. In addition, the direct methods and the indirect methods may be applied simultaneously. The detailed contents for the block matching method and the OF method will be described below.

The encoding apparatus may be difficult in calculating more accurate motion information only with the encoded information of the target block due to the characteristics of the motion information calculation of the target block, and accordingly, the time when the encoding apparatus calculates the modified motion information may be after performing the encoding procedure of the target picture in which the target block is included, not after the encoding procedure of the target block, for example. That is, the encoding apparatus may perform an encoding procedure of the target picture and calculate the modified motion information based on more information than that of right after performing the encoding procedure of the target block.

Meanwhile, the encoding apparatus may further generate motion vector update differential information that indicates differential between the existing motion vector included in the (first) motion information and the modified motion information and encode and output it. The motion vector update differential information may be transmitted in the unit of PU.

The encoding apparatus determines whether to update the motion information of the target block (step, S420). The encoding apparatus may determine whether to update the (first) motion information through a comparison of accuracy between the (first) motion information and the modified motion information. For example, the encoding apparatus may determine whether to update the (first) motion information by using an amount of difference between an image derived by the motion compensation using each motion information and an original image. In other words, the encoding apparatus may determine whether to update by comparing an amount of data of the residual signal between a reference block derived based on each motion information and an original block of the target block.

In step S420, in the case that it is determined to update the motion information of the target block, the encoding apparatus updates the motion information of the target block based on the modified motion information and store the modified motion information (step, S430). For example, in the case that the amount of data of the residual signal between a specific reference block derived based on the modified motion information and the original block is smaller than the amount of data of the residual signal between the reference block derived based on the (first) motion information and the original block, the encoding apparatus may update the (first) motion information based on the modified motion information. In this case, the encoding apparatus may update the motion information of the target block by substituting the (first) motion information to the modified motion information and store the updated motion information including only the modified motion information. In addition, the encoding apparatus may update the motion information of the target block by adding the modified motion information to the (first) motion information and store the updated motion information including the (first) motion information and the modified motion information.

Meanwhile, in step S420, in the case that it is not determined to update the motion information of the target block, the encoding apparatus stores the (first) motion information (step, S440). For example, in the case that the amount of data of the residual signal between a specific reference block derived based on the modified motion information and the original block is not smaller than the amount of data of the residual signal between the reference block derived based on the (first) motion information and the original block, the encoding apparatus may store the (first) motion information.

On the other hand, although it is not shown, in the case that the modified motion information is derived without determination of update through comparison between the (first) motion information used in the inter prediction and the modified motion information, the encoding apparatus may update the motion information of the target block based on the modified motion information.

Meanwhile, since the decoding apparatus is not available to use the original image, the decoding apparatus may receive additional information indicating whether to update the target block. That is, the encoding apparatus may generate and encode the additional information indicating whether to update and output it through bitstream. For example, the additional information indicating whether to update may be referred as an update flag. The case that the update block is 1 may indicate that the motion information is updated and the case that the update block is 0 may indicate that the motion information is not updated. For example, the update flag may be transmitted in a unit of PU. Alternatively, the update flag may be transmitted in a unit of CU, a unit of CTU or a unit of slice and may be transmitted through a higher level such as a unit of picture parameter set (PPS) or a unit of sequence parameter set (SPS).

In addition, the decoding apparatus may determine whether to update through comparison between the (first) motion information of the target block and the modified motion information based on the reconstructed block of the target block without receiving the update flag, and in the case that it is determined that the motion information of the target block is updated, the decoding apparatus may update the motion information of the target block based on the modified motion information and store the updated motion information. In addition, in the case that the modified motion information is derived without determination of update through comparison between the motion information used in the inter prediction and the modified motion information, the decoding apparatus may update the motion information of the target block based on the modified motion information. In this case, the decoding apparatus may update the motion information of the target block by substituting the (first) motion information to the modified motion information and store the updated motion information including only the modified motion information. In addition, the decoding apparatus may update the motion information of the target block by adding the modified motion information to the (first) motion information and store the updated motion information including the (first) motion information and the modified motion information.

In the case that the procedure of updating the motion information is performed after the encoding procedure of the target block, the encoding procedure of a next block neighboring the target block of the next encoding order of the target block may be performed.

Figure 5:
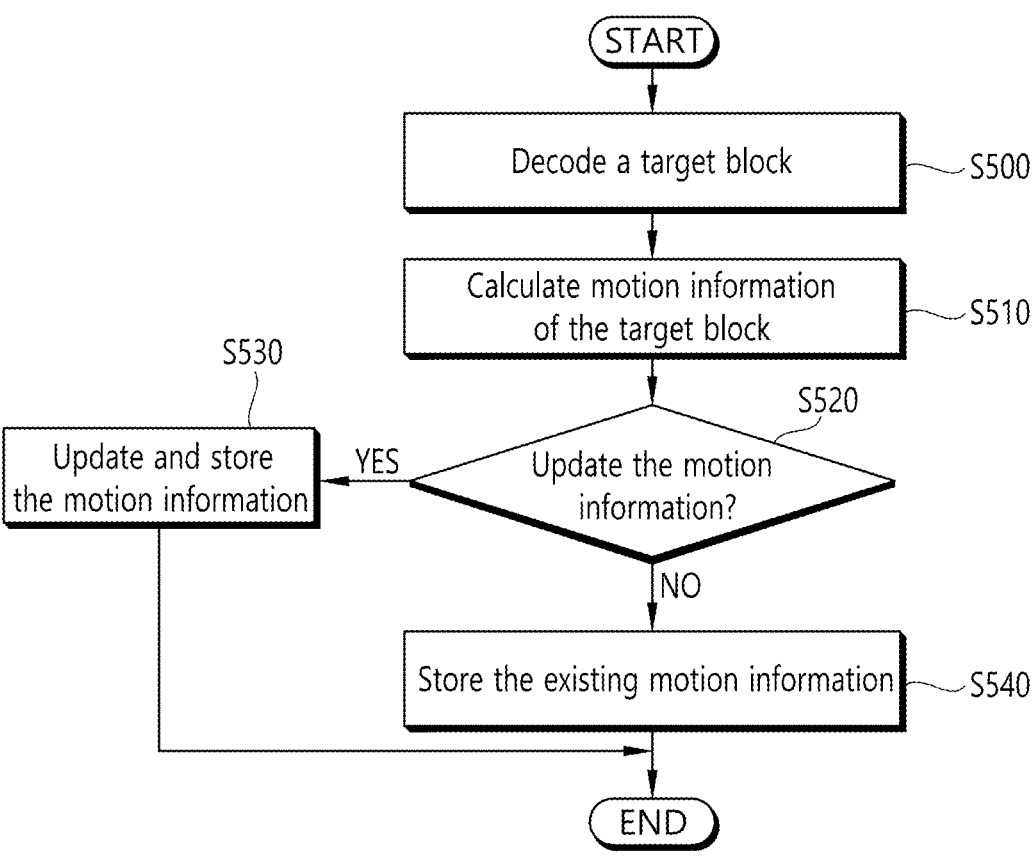
FIG. 5 illustrates an example of decoding procedure including a method of updating the motion information of a target block.

FIG. 5 illustrates an example of decoding procedure including a method of updating the motion information of a target block. The decoding procedure may be performed in a similar way to the encoding procedure described above. A decoding apparatus decodes a target block (step, S500). In the case that the inter prediction is applied to the target block, the decoding apparatus may obtain information for the inter prediction of the target block through a bitstream. The decoding apparatus may derive motion information of the target block based on the information for the inter prediction and derive a prediction sample by performing the inter prediction for the target block. The motion information may be referred to as first motion information. The decoding apparatus may generate a reconstructed block of the target block based on the prediction sample.

The decoding apparatus calculates modified motion information of the target block (step, S510). The decoding apparatus may calculate the modified motion information through various methods. The modified motion information may be referred to as second motion information. At least one method including direct methods such as an optical flow (OF) method, a block-matching method, a frequency domain method, and the like and indirect methods such as a singularity matching method, a method using a statistical property, and the like may be applied to the method. In addition, the direct methods and the indirect methods may be applied simultaneously. The detailed contents for the block matching method and the OF method will be described below.

The decoding apparatus may be difficult in calculating more accurate motion information only with the decoded information of the target block due to the characteristics of the motion information calculation of the target block, and accordingly, the time when the decoding apparatus calculates the modified motion information may be after performing the decoding procedure of the target picture in which the target block is included, not after the decoding procedure of the target block, for example. That is, the decoding apparatus may perform a decoding procedure of the target picture and calculate the modified motion information based on more information than that of right after performing the decoding procedure of the target block.

Meanwhile, the decoding apparatus may also obtain generate motion vector update differential information that indicates differential between the existing motion vector included in the (first) motion information and the modified motion information through a bitstream. The motion vector update differential information may be transmitted in the unit of PU. In this case, the decoding apparatus may not calculate the modified motion information independently through the direct method and the indirect method described above but derive the modified motion information by summing the (first) motion information and the obtained motion vector update differential information. That is, the decoding apparatus may derive the existing motion vector with a motion vector predictor (MVP) of the modified motion information and by adding the motion vector update differential information to the existing motion vector and derive the modified motion vector.

The decoding apparatus determines whether to update the motion information of the target block (step, S520). The decoding apparatus may determine whether to update the (first) motion information through a comparison of accuracy between the (first) motion information and the modified motion information. For example, the decoding apparatus may determine whether to update the (first) motion information by using an amount of difference between a reference block derived by the motion compensation using each motion information and the reconstructed block of the target block. In other words, the encoding apparatus may determine whether to update by comparing an amount of data of the residual signal between a reference block derived based on each motion information and an original block of the target block.

Meanwhile, the decoding apparatus receive additional information indicating whether to update from the encoding apparatus and determine whether to update the motion information of the target block based on the additional information. For example, the additional information indicating whether to update may be referred as an update flag. The case that the update block is 1 may indicate that the motion information is updated and the case that the update block is 0 may indicate that the motion information is not updated. For example, the update flag may be transmitted in a unit of PU.

In step S520, in the case that it is determined to update the motion information of the target block, the decoding apparatus updates the motion information of the target block based on the modified motion information and store the updated motion information (step, S530). For example, in the case that the amount of data of the residual signal between a specific reference block derived based on the modified motion information and the reconstructed block is smaller than the amount of data of the residual signal between the reference block derived based on the (first) motion information and the reconstructed block, the decoding apparatus may update the (first) motion information based on the modified motion information. In this case, the decoding apparatus may update the motion information of the target block by substituting the (first) motion information to the modified motion information and store the updated motion information including only the modified motion information. In addition, the decoding apparatus may update the motion information of the target block by adding the modified motion information to the (first) motion information and store the updated motion information including the (first) motion information and the modified motion information.

Meanwhile, in step S520, in the case that it is not determined to update the motion information of the target block, the decoding apparatus stores the (first) motion information (step, S540). For example, in the case that the amount of data of the residual signal between a specific reference block derived based on the modified motion information and the reconstructed block is not smaller than the amount of data of the residual signal between the reference block derived based on the (first) motion information and the reconstructed block, the decoding apparatus may store the (first) motion information.

On the other hand, although it is not shown, in the case that the modified motion information is derived without determination of update through comparison between the (first) motion information and the modified motion information, the decoding apparatus may update the motion information of the target block based on the modified motion information.

Meanwhile, the stored motion information and the motion information for transmission may have different resolution. In other words, the unit of motion vector included in the modified motion information and the unit of motion vector included in the motion information derived based on the information for the inter prediction may be different. For example, the unit of motion vector of the motion information derived based on the information for the inter prediction may have a unit of ¼ fractional sample and the unit of motion vector of the modified motion information calculated in the decoding apparatus may have a unit of ⅛ fractional sample or 1/16 fractional sample. The decoding apparatus may adjust the resolution to a resolution required to store in the process of calculating the modified motion information or adjust the resolution through a calculation (e.g., round off, multiplication, etc.) in the process of storing the modified motion information. In the case that the resolution of the motion vector of the modified motion information is higher than the motion vector of the motion information derived based on the information for the inter prediction, an accuracy may be increased for a scaling operation for a temporal neighboring motion information calculation. In addition, in the case of the decoding apparatus of which resolutions for transmission of the motion information and for internal operation are different, there is an effect that decoding may be performed in accordance with the internal operation criterion.

Meanwhile, in the case that the block matching method is applied among the methods for calculating the modified motion information, the modified motion information may be derived as follows. The block matching method may be represented as a motion estimation method used in the encoding apparatus.

A coding apparatus may measure a degree of distortion by accumulating differential values between samples according to phases of a target block and a reference block and use these as cost functions, and then, derive a reference block which is the most similar to the target block. That is, the coding apparatus may derive the modified motion information of the target block based on a reference block of which residual from the reconstructed block (or original block) of the target block is a minimum. The reference block of which residual is the minimum may be referred to as a specific reference block. Sum of absolute differences (SAD) and mean squared error (MSE) may be used for the function of representing the differential values between samples. The SAD, in which a degree of distortion is measured by accumulating absolute values of the differential values between samples according to phases of the target block and the reference block, may be derived based on the following equation.

$$SAD = \sum_{j}^{height} \sum_{i}^{width} |Block_{cur}(i, j) - Block_{ref}(i, j)| \qquad \text{[Equation 1]}$$

Herein, $Block_{cur}(i, j)$ represents a reconstructed sample (or original sample) of (i, j) coordinate in the reconstructed block (or original block) of the target block, $Block_{ref}(i, j)$ represents a reconstructed sample of (i, j) coordinate in the reference block, width is a width of the reconstructed block (or original block) and height represents a height of the reconstructed block (or original block).

In addition, the MSE, in which a degree of distortion is measured by accumulating square values of the differential values between samples according to phases of the target block and the reference block, may be derived based on the following equation.

$$MSE = \frac{1}{width * height} \sum_{j}^{height} \sum_{i}^{width} (Block_{cur}(i, j) - Block_{ref}(i, j))^2 \qquad \text{[Equation 2]}$$

Herein, $Block_{cur}(i, j)$ represents a reconstructed sample (or original sample) of (i, j) coordinate in the reconstructed block (or original block) of the target block, $Block_{ref}(i, j)$ represents a reconstructed sample of (i, j) coordinate in the reference block, width is a width of the reconstructed block (or original block) and height represents a height of the reconstructed block (or original block).

The calculation complexities of the methods for calculating the modified motion information may be changed flexibly depending on a search range for searching the specific reference block. Accordingly, in the case of calculating the modified motion information of the target block by using the block matching method, the decoding apparatus may search only the reference blocks included in a predetermined area from the reference block derived through the (first) motion information which is used in the decoding procedure of the target block, and through this, low calculation complexity may be maintained.

Figure 6:
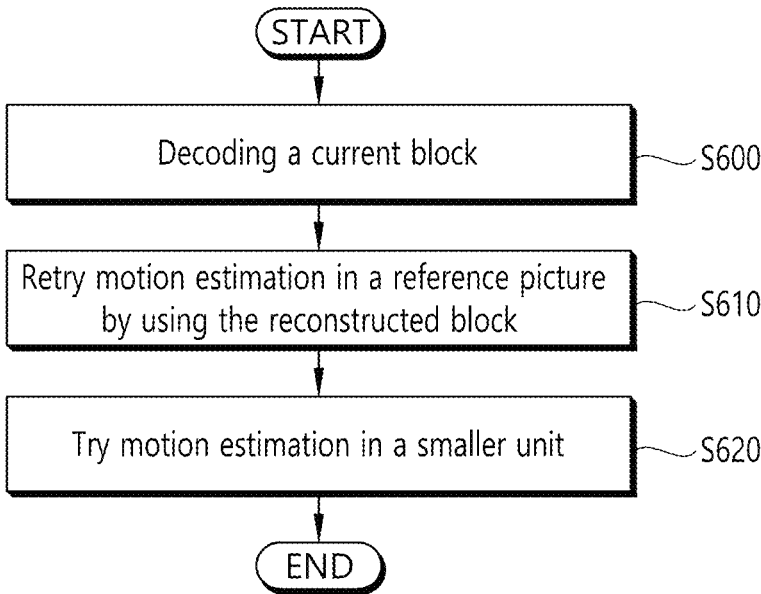
FIG. 6 illustrates an example of a method of updating the motion information of the target block through the block matching method by the decoding apparatus.

FIG. 6 illustrates an example of a method of updating the motion information of the target block through the block matching method by the decoding apparatus. The decoding apparatus decodes the target block (step, S600). In the case that the inter prediction is applied to the target block, the decoding apparatus may obtain information for the inter prediction of the target block through a bitstream. Since the method of updating the motion information of the target block applied to the encoding apparatus should be applied to the decoding apparatus in the same manner, the encoding apparatus and the decoding apparatus may calculate the modified motion information of the target block based on the reconstructed block of the target block.

The decoding apparatus performs a motion estimation in a reference picture for the modified motion information by using the reconstructed block (step, S610). The decoding apparatus may derive a reference picture for the motion information derived based on the information for the inter prediction as the specific reference picture for the modified motion information and detect the specific reference picture among the reference blocks in the reference picture. The specific reference block may be a reference block of which summation of absolute values of the differential values between samples from the reference block among the reference blocks, that is, sum of absolute differences (SAD) is the minimum. In addition, the decoding apparatus may limit the search area for detecting the specific reference block to a predetermined area from the reference block represented through the motion information derived based on the information for the inter prediction. In other words, the decoding apparatus may derive the reference block of which SAD from the reconstructed block is the minimum among the reference blocks located in a predetermined area from the reference block as the specific reference block. The decoding apparatus may perform a motion estimation only in a predetermined area from the reference block, and through this, increase reliability of the modified motion information while decreasing the calculation complexity.

In the case that a size of the reconstructed block of the target block is greater than a specific size, to calculate the modified motion information elaborately, the decoding apparatus partitions the reconstructed block into small blocks of which sizes are smaller than the specific size and calculate more detailed motion information based on each of the small blocks (step, S620). The specific size may be preconfigured, and the partitioned blocks may be referred to as sub reconstructed blocks. The decoding apparatus may partition the reconstructed block into a plurality of sub reconstructed blocks and derive a specific sub reference block in a unit of each sub reconstructed block within a reference picture for the modified motion information based on the sub reconstructed blocks and derive the derived specific sub reference blocks as the specific reference block. The decoding apparatus may calculate the modified motion information based on the specific reference block.

Meanwhile, in the case that the optical flow (OF) method is applied among the method for calculating the modified motion information, the modified motion information may be derived as follows. The OF method may be calculated based on an assumption that a velocity of an object in the target block is uniform and sample values of the samples representing the object is not changed in an image. In the case that the object moves by $\delta x$ in x axis and $\delta y$ in y axis for time $\delta t$, the following equation may be established.

$$I(x,\, y,\, t) = I(x + \delta x,\, y + \delta y,\, t + \delta t) \qquad \text{[Equation 3]}$$

Herein, I(x,y,t) indicates a sample value of the reconstructed sample in (x, y) position representing the object on time t, which is included in the target block.

In Equation 3, when the right term is expanded in Taylor series, the following equation may be derived.

$$I(x + \delta x,\, y + \delta y,\, t + \delta t) \approx I(x,\, y,\, t) + \frac{\partial I}{\partial x}\delta x + \frac{\partial I}{\partial y}\delta y + \frac{\partial I}{\partial t}\delta t \qquad \text{[Equation 4]}$$

When equation 4 is satisfied, the following equation may be established.

$$\frac{\partial I}{\partial x}\delta x + \frac{\partial I}{\partial y}\delta y + \frac{\partial I}{\partial t}\delta t = 0 \qquad \text{[Equation 5]}$$

Equation 5 is rewritten, and the following equation may be derived.

$$\frac{\partial I}{\partial x}\frac{\delta x}{\delta t} + \frac{\partial I}{\partial y}\frac{\delta y}{\delta t} + \frac{\partial I}{\partial t}\frac{\delta t}{\delta t} = 0 \qquad \text{[Equation 6]}$$

$$\frac{\partial I}{\partial x}v_x + \frac{\partial I}{\partial y}v_y + \frac{\partial I}{\partial t} = 0$$

Herein, $v_x$ is a vector component in x axis of the calculated motion vector and $v_y$ is a vector component in y axis of the calculated motion vector. The decoding apparatus may derive values partial derivative values of the object on x axis, y axis and t axis, and derive the motion vector ($v_x$, $v_y$)

of the current position, that is, the position of the reconstructed sample by applying the derived partial derivative values to the equation. In this case, for example, the decoding apparatus may configure the reconstructed samples in the reconstructed block of the target block representing the object to reconstructed samples included in an area unit of 3×3 size, and calculate the motion vector ($v_x$, $v_y$) which approaches the left term to 0 by applying the equation to the reconstructed samples.

The format of storing the modified motion information of the target block calculated by the coding apparatus may have various formats, since it may be used for the picture coded after the coding procedure of the target picture included in a next block neighboring the target block or the target block, it may be beneficent that the modified motion information may be stored in the same format as the motion information used in the prediction of the target block. The motion information used in the prediction may include information on whether it is uni-prediction or bi-prediction, a reference picture index and a motion vector. The modified motion information may be calculated to have the same format as the motion information used in the prediction.

In the case that there is only one reference picture of the target picture, that is, the bi-prediction is available be performed except the case that a value of picture order count (POC) of the target picture is 1. Generally, the prediction performance may be high in the case that the encoding apparatus performs the bi-prediction in comparison with the case that the encoding apparatus performs the uni-prediction. Accordingly, in the case that the target picture is available to perform the bi-prediction, to improve the overall coding efficiency of an image by propagating accurate motion information, the coding apparatus may calculate and update the modified motion information of the target block with the bi-prediction through the method described above. However, even in the case that the target picture is available to perform the bi-prediction, that is, even in the case that a value of POC of the target picture is not 1, an occlusion may occur and the case that the bi-prediction is not available to be performed may occur. The occlusion may be determined to be occurred when the motion is compensated based on the modified motion information and the sum of the absolute values of the differentials of samples of the prediction sample derived by motion compensation based on the modified motion information and the samples of the reconstructed block (or original block) of the target block is greater than a predetermined threshold value. For example, in the case that the modified motion information of the target block is the bi-prediction motion information, when the sum of the absolute values of the differentials of samples of the prediction sample derived based on the L0 motion vector included in the modified motion information and the samples of the reconstructed block (or original block) of the target block is greater than a predetermined threshold value, according to the prediction for the L0, it may be determined that the occlusion occurs. In addition, when the sum of the absolute values of the differentials of samples of the prediction sample derived based on the L1 motion vector included in the modified motion information and the samples of the reconstructed block (or original block) of the target block is greater than a predetermined threshold value, according to the prediction for the L1, it may be determined that the occlusion occurs. In the case that the occlusion occurs by the prediction for either one of L0 and L1, the coding apparatus may derive the modified motion information as the uni-prediction motion information except the information for the prediction for the list in which the occlusion occurs.

In the case that the occlusion occurs by the prediction for either one of L0 and L1 or it is available to calculate the modified motion information, the method of updating the motion information of the target block may be applied by using the motion information of the neighboring block of the target block, and alternatively, the method of not updating the motion information of the target block may be applied based on the modified motion information. In order to store and propagate accurate motion information, in the case described above, the method of not updating the motion information of the target block based on the modified motion information may be more proper.

L0 reference picture index and L1 reference picture index of the modified motion information may indicate one of reference pictures in the reference picture list (the L0 or the L1). The reference picture indicated by the reference picture index of the modified motion information may be referred to as a specific reference picture. A method of selecting one of several reference pictures in the reference picture list may be as described below.

For example, the encoding apparatus may select a reference picture which is the most recently encoded among the reference pictures included in the reference picture list. That is, the encoding apparatus may generate a reference picture index included in the modified motion information that indicates the reference picture which is the most recently encoded among the reference pictures included in the reference picture list.

In addition, the encoding apparatus may select a reference picture that has a POC which is the nearest to the picture order count (POC) of the current picture in the reference picture list. That is, the encoding apparatus may generate a reference picture index included in the modified motion information that indicates the reference picture that has a POC of which absolute value of the difference from the POC of the target picture including the target block among the reference pictures included in the reference picture list.

Furthermore, the encoding apparatus may select a reference picture which is belonged to a lower layer in the hierarchical structure in the reference picture list. The reference picture which is belonged to a lower layer may be I-slice or a reference picture encoded by applying a low quantization parameter (QP).

In addition, the encoding apparatus may select a reference picture of which reliability of the motion compensation is highest in the reference picture list. That is, encoding apparatus may derive a specific reference block of the reconstructed block (or original block) of the target block among the reference blocks located in the reference pictures included in the reference picture list and generate a reference picture index included in the modified motion information that indicates the reference picture including the specific reference block which is derived.

The methods of generating the reference picture index of the modified motion information described above may be independently applied or the methods may be applied in combination.

The motion vector included in the modified motion information may be derived through at least one method including the OF method, the block-matching method, the frequency domain method, and the like, and it may be required to have the motion vector in a unit of at least minimum block.

Figure 7:
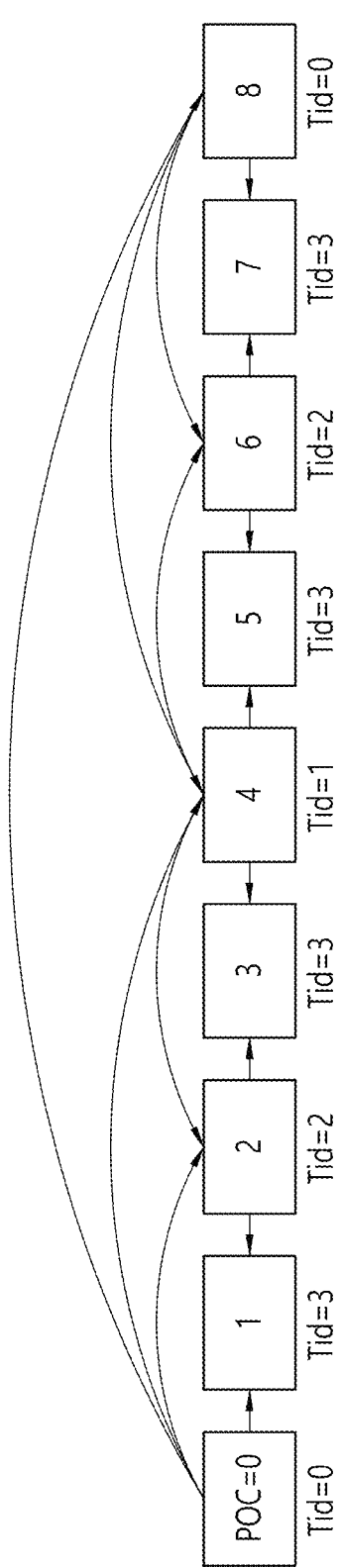
FIG. 7 illustrates reference pictures which can be used in the modified motion information.

FIG. 7 illustrates reference pictures which can be used in the modified motion information.

Referring to FIG. 7, in the case that a target picture is a picture of which POC value is 3, the bi-prediction may be performed for the target picture, a picture of which POC value is 2 and a picture of which POC value is 4 may be derived as reference pictures of the target picture. L0 of the target picture may include a picture of which POC value is 2 and a picture of which POC value is 0, and respective corresponding values of L0 reference picture indices may be 0 and 1. In addition, L1 of the target picture may include a picture of which POC value is 4 and a picture of which POC value is 8, and respective corresponding values of L1 reference picture indices may be 0 and 1. In this case, the encoding apparatus may select specific reference pictures of the modified motion information of the target picture as a reference picture having a POC of which absolute value of a difference from the target picture among the reference pictures in each reference picture list is the smallest. Furthermore, the encoding apparatus may derive a motion vector of the modified motion information in a unit of block of 4×4 size in the target picture. The OF method may be applied to the method of deriving the motion vector. The motion vector derived based on a reference picture of which POC value is 2 may be stored in L0 motion information included in the modified motion information and the motion vector derived based on a reference picture of which POC value is 4 may be stored in L1 motion information included in the modified motion information.

In addition, referring to FIG. 7, in the case that a target picture is a picture of which POC value is 8, the target picture may perform the uni-prediction and a picture of which POC value is 0 may be derived as a reference picture of the target picture. L0 of the target picture may include a reference picture of which POC value is 0 and a value of the L0 reference picture index corresponding to the reference picture may be 0. In this case, the encoding apparatus may select a specific reference picture of the modified motion information of the target picture as a reference picture having a POC of which absolute value of a difference from POC of the target picture among the reference pictures included in L0 is the smallest. Furthermore, the encoding apparatus may derive a motion vector of the modified motion information in a unit of block of 4×4 size in the current picture. The OF method may be applied to the method of deriving the motion vector. The block matching method may be applied to the method of deriving the motion vector, and the motion vector derived based on a reference picture of which POC value is 0 may be stored in L0 motion information included in the modified motion information.

Referring to the embodiments described above, the reference picture of the modified motion information of the target picture may be derived to indicate a reference picture having a POC of which absolute value of a difference from POC of the target picture among the reference pictures included in the reference picture list is the smallest, and the motion vector of the modified motion information may be calculated in a unit of block of 4×4 size. In the case that the target picture is a picture of which POC is 8, the uni-prediction is performed since the target picture is a picture in which the inter prediction is performed firstly among the pictures shown in FIG. 7, but in the that the target picture is a picture of which POC is 3, the bi-prediction is available and the modified motion information of the target picture may be determined to be bi-prediction motion information. In addition, even in the case that the target picture is a picture of which POC is 3, in the case that the modified motion information is calculated and updated in a unit of block in the target picture, the encoding apparatus may determine a selection of one motion information format including the bi-prediction motion information and the uni-prediction motion information in a unit of block.

In addition, different from the embodiment described above, the reference picture index of the modified motion information may be generated to indicate a reference picture selected by a hierarchical structure, not the reference picture having a POC of which absolute value of a difference from POC of the target picture among the reference pictures included in the reference picture list is the smallest. For example, in the case that a target picture is a picture of which POC is 5, L0 reference picture index of the modified motion information of the target picture may indicates a picture of which POC value is 0, not a picture of which POC value is 4. On the timing after performing the encoding procedure of the target picture, most of a reference picture which is most recently encoded may indicate a reference picture having a POC of which absolute value of a difference from POC of the target picture is the smallest. However, like the case of a picture of which POC value is 6, a reference picture which is most recently encoded is a reference picture of which POC value is 2, and a picture having a POC of which absolute value of a difference from POC of the target picture is the smallest is a picture of which POC value is 4, and accordingly, the case of indicating different reference picture may occur.

In the case that the motion information of the target block is updated to the modified motion information through the method described above, the inter prediction of a next block neighboring the target block may be performed by using the modified motion information (the target block may be referred to as a first block and the next block may be referred to as a second block). The method of utilizing the modified motion information in the inter prediction mode of the next block may include a method of indexing and transmitting the modified motion information and a method of representing the motion vector of the next block as a differential value between the motion vector of the target block and the motion vector of the next block. The method of indexing and transmitting the modified motion information may be a method in the case that the merge mode is applied to the next block among the inter prediction modes, and the method of representing the motion vector of the next block as a differential value between the motion vector of the target block and the motion vector of the next block may be a method in the case that the AMVP mode is applied to the next block among the inter prediction modes.

Figure 8:
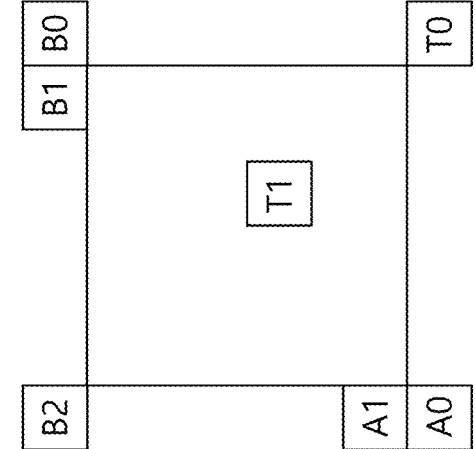
FIG. 8 illustrates an example of a merge candidate list of a next block neighboring the target blocks in the case that the motion information of the target blocks is updated to the modified motion information of the target blocks.

FIG. 8 illustrates an example of a merge candidate list of a next block neighboring the target blocks in the case that the motion information of the target blocks is updated to the modified motion information of the target blocks. Referring to FIG. 8, the coding apparatus may configure the merge candidate list of the next block including the target blocks. The encoding apparatus may transmit a merge index indicating a block which is the most similar to the motion information of the next block among the blocks included in the merge candidate list. In this case, the updated motion information of the target blocks may be used for motion information of a spatial neighboring candidate block of the next block, or alternatively, used for the motion information of a temporal neighboring candidate block. The motion information of the target blocks may include the modified motion information of the target blocks. As shown in FIG. 8, the motion information of the spatial neighboring candidate block may represent one motion information among the stored motion information of the blocks neighboring the next block on A1, B1, B0, A0 and B2 positions. The motion information of the target blocks encoded before the encoding of the next block may be updated, and the updated motion information may influence on the encoding procedure of the next block. In the case that motion information including an error is propagated to the next block through the merge mode, the error may be accumulated and propagated, but the propagated error may be reduced by updating the motion information in each block through the method described above.

Figure 9:
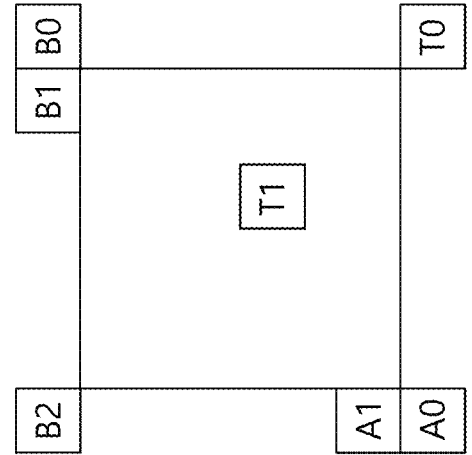
FIG. 9 illustrates an example of a merge candidate list of a next block neighboring the target blocks in the case that the motion information of the target blocks is updated to the modified motion information of the target blocks.

FIG. 9 illustrates an example of a merge candidate list of a next block neighboring the target blocks in the case that the motion information of the target blocks is updated to the modified motion information of the target blocks. The (first) motion information and the modified motion information used in prediction of the target block neighboring the next block may be stored. In this case, the coding apparatus may configure the target block indicating the modified motion information of the target block which is newly calculated in the merge candidate list of the next block as a separate merge candidate block. As shown in FIG. 9, the target block indicating the modified motion information of the target block may be inserted to the merge candidate list next to the target block indicating the (first) motion information which is applied in the encoding procedure of the target block neighboring the next block. In addition, the priority of the merge candidate list may be changed, and the number of inserted positions may be differently configured.

Although A1 and B1 are illustrated as an example of the target blocks in which the modified motion information is derived, this is just an example, and the modified motion information may be derived even for the remaining A0, B0, B2, T0 and T1, and the merge candidate list may be configured based on it.

For example, the next block may be located on a picture different from the target block, and the temporal neighboring candidate block of the next block may be included in the merge candidate list. The motion information of the temporal neighboring candidate block may be selected through the merge index of the next block. In this case, the motion information of the temporal neighboring candidate block may be updated to the modified motion information through the method described above, and the temporal neighboring candidate block indicating the updated motion information may be inserted in the merge candidate list of the next block. In addition, through the method described above, the (first) motion information and the modified motion information of the temporal neighboring candidate block may be separately stored. In this case, in the procedure of generating the merge candidate list of the next block, the temporal neighboring candidate block indicating the modified motion information may be inserted as an additional candidate of the merge candidate list.

Different from the contents shown in FIG. 9, the AMVP mode may be applied to the next block. In the case that the AMVP mode is applied to the next block, the coding apparatus may generate a motion vector predictor candidate list based on the motion information of the neighboring blocks of the next block.

Figure 10:
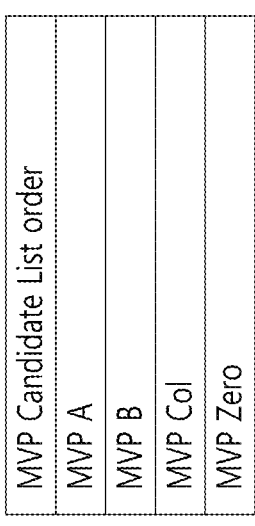
FIG. 10 illustrates an example of a motion vector predictor candidate list of a next block neighboring the target block in the case that the motion information of the target block is updated based on the modified motion information of the target block.
Figure 10:
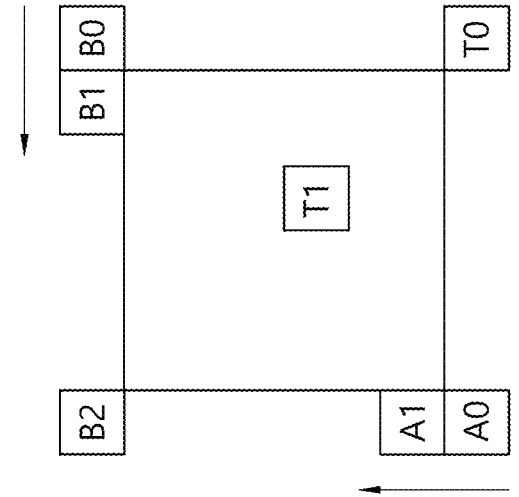

FIG. 10 illustrates an example of a motion vector predictor candidate list of a next block neighboring the target block in the case that the motion information of the target block is updated based on the modified motion information of the target block. The encoding apparatus may select the motion information according to a specific condition among the motion information included in the motion vector predictor candidate list and transmit a motion vector difference (MVD) value from an index indicating the selected motion information, the motion vector of the selected motion information motion vector of the motion information of the next block. Like the method of inserting the block indicating the updated motion information of the neighboring next block in the merge candidate list in spatial or temporal merge candidate block in the merge mode described above, the procedure of generating a list including the motion information of the neighboring blocks of the AMVP mode may be applied to the method of inserting the updated motion information of the neighboring block as a spatial or temporal motion vector predictor (MVP) candidate. As shown in FIG. 10, the coding apparatus may detect whether the updated motion information of target block A0 and target block A1 of the neighboring next block is in accordance with a predefined specific condition in an order of the arrow direction and derive the updated motion information in accordance with the specific condition which is detected firstly as MVP A which is included in the motion predictor candidate list.

In addition, the coding apparatus may detect whether the updated motion information of target block B0, target block B1 and target block B2 of the neighboring next block is in accordance with a predefined specific condition in an order of the arrow direction and derive the updated motion information in accordance with the specific condition which is detected firstly as MVP B which is included in the motion predictor candidate list.

Furthermore, the next block may be positioned in different picture from the target block, and the temporal MVP candidate of the next block may be included in the motion vector predictor candidate list. As shown in FIG. 10, the coding apparatus may detect whether it is in accordance with a predefined specific condition in an order of the updated motion information of target block T0 located in the reference picture of the next block to the updated motion information of target block T1 and derive the updated motion information in accordance with the specific condition which is detected firstly as MVP Col which is included in the motion predictor candidate list. In the case that the MVP A, the MVP B and/or the MVP Col are the updated motion information by being replace by the modified motion information, the updated motion information may be used for the motion vector predictor candidate of the next block.

Meanwhile, in the case that smaller number of the MVP candidates in the motion predictor candidate list are derived than a specific number, the coding apparatus derives zero vector as MVP zero and include it in the motion predictor candidate list.

Figure 11:
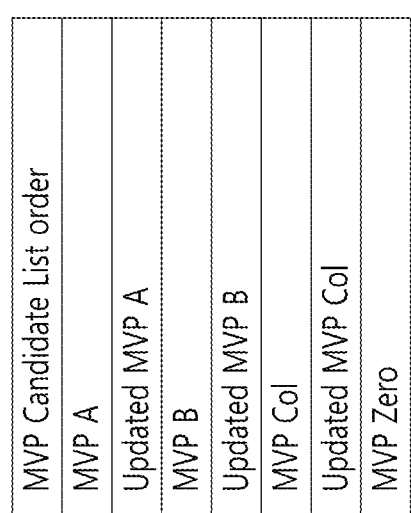
FIG. 11 illustrates an example of a motion vector predictor candidate list of a next block neighboring the target block in the case that the motion information of the target block is updated based on the modified motion information of the target block.
Figure 11:
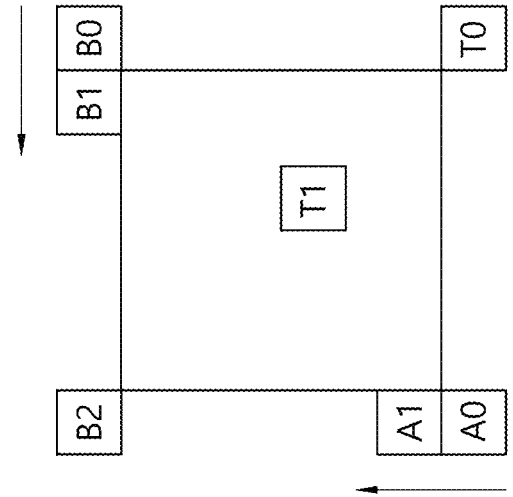

FIG. 11 illustrates an example of a motion vector predictor candidate list of a next block neighboring the target block in the case that the motion information of the target block is updated based on the modified motion information of the target block. In the case that the motion information of the target block is the updated motion information including the modified motion information and the existing motion information, the coding apparatus may detect whether the existing motion information of target block A0 and target block A1 of the neighboring next block is in accordance with a specific condition in an order of the arrow direction and derive the existing motion information in accordance with the specific condition which is detected firstly as MVP A which is included in the motion predictor candidate list.

In addition, the coding apparatus may detect whether the modified motion information of the target block A0 and the target block A1 is in accordance with a specific condition in an order of the arrow direction and derive the modified motion information in accordance with the specific condition which is detected firstly as updated MVP A which is included in the motion predictor candidate list.

Furthermore, the coding apparatus may detect whether the existing motion information of target block B0, target block B1 and target block B2 of the neighboring next block is in accordance with a predefined specific condition in an order of the arrow direction and derive the existing motion information in accordance with the specific condition which is detected firstly as MVP B which is included in the motion predictor candidate list.

In addition, the coding apparatus may detect whether the modified motion information of target block B0, target block B1 and target block B2 is in accordance with a specific condition in an order of the arrow direction and derive the updated motion information in accordance with the specific condition which is detected firstly as updated MVP B which is included in the motion predictor candidate list.

Furthermore, the coding apparatus may detect whether it is in accordance with a specific condition in an order of the existing motion information of target block T0 located in the reference picture of the next block to the existing motion information of target block T1 and derive the existing motion information in accordance with the specific condition which is detected firstly as MVP Col which is included in the motion predictor candidate list.

In addition, the coding apparatus may detect whether it is in accordance with a specific condition in an order of the modified motion information of target block T0 located in the reference picture of the next block to the modified motion information of target block T1 and derive the modified motion information in accordance with the specific condition which is detected firstly as MVP Col which is included in the motion predictor candidate list.

Meanwhile, in the case that smaller number of the MVP candidates in the motion predictor candidate list are derived than a specific number, the coding apparatus derives zero vector as MVP zero and include it in the motion predictor candidate list.

Figure 12:
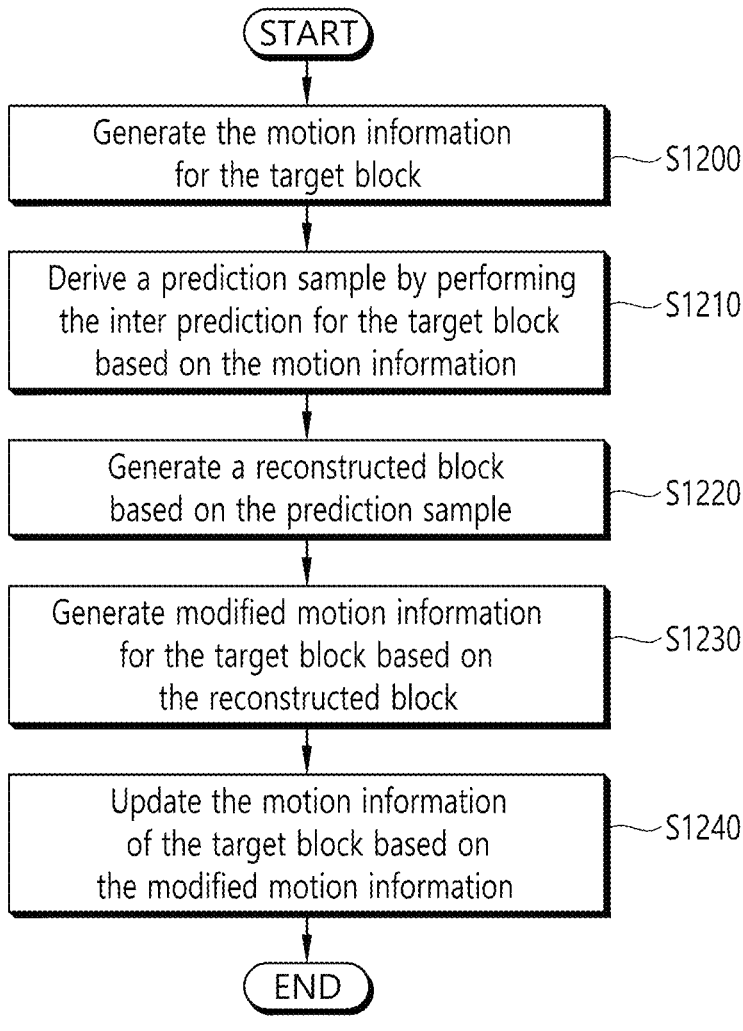
FIG. 12 schematically illustrates a video encoding method by an encoding apparatus according to the present invention.

FIG. 12 schematically illustrates a video encoding method by an encoding apparatus according to the present invention. The method shown in FIG. 12 may be performed by the encoding apparatus shown in FIG. 1. In a detailed example, steps S1200 to S1230 of FIG. 12 may be performed by a prediction unit of the encoding apparatus and step S1240 may be performed by a memory of the encoding apparatus.

The encoding apparatus generates the motion information for the target block (step, S1200). The encoding apparatus may apply the inter prediction to the target block. In the case that the inter prediction is applied to the target block, the encoding apparatus may generate the motion information for the target block by applying at least one of the skip mode, the merge mode and the adaptive motion vector prediction (AMVP) mode. The motion information may be referred to as first motion information. In the case of the skip mode and the merge mode, the encoding apparatus may generate the motion information for the target block based on the motion information of a neighboring block of the target block. The motion information may include a motion vector and a reference picture index. The motion information may be bi-prediction motion information or uni-prediction motion information. The bi-prediction motion information may include L0 reference picture index and L0 motion vector, and L1 reference picture index and L1 motion vector, and the uni-directional motion information may include L0 reference picture index and L0 motion vector or L1 reference picture index and L1 motion vector. The L0 indicates reference picture list L0 (list 0) and the L1 indicates reference picture list L1 (list 1).

In the case of the AMVP mode, the encoding apparatus may derive the motion vector of the target block by using the motion vector of the neighboring block of the target block as a motion vector predictor (MVP) and generate the motion information including the motion vector and the reference picture index for the motion vector.

The encoding apparatus derives a prediction sample by performing the inter prediction for the target block based on the motion information (step, S1210). The encoding apparatus may generate the prediction sample of the target block based on the reference picture index and the motion vector included in the motion information.

The encoding apparatus generates a reconstructed block based on the prediction sample (step, S1220). The encoding apparatus may generate the reconstructed block of the target block based on the prediction sample or generate a residual signal of the target block and generate the reconstructed block of the target block based on the residual signal and the prediction sample.

The encoding apparatus generates modified motion information for the target block based on the reconstructed block (step, S1230). The encoding apparatus may calculate the modified reference picture index indicating a specific reference picture for the modified motion information and a modified motion vector for the specific reference picture through various methods. The modified motion information may be referred to as second motion information. At least one method including direct methods such as an optical flow (OF) method, a block-matching method, a frequency domain method, and the like and indirect methods such as a singularity matching method, a method using a statistical property, and the like may be applied to the method. In addition, the direct methods and the indirect methods may be applied simultaneously.

For example, the encoding apparatus may generate the modified motion information through the block matching method. In this case, the encoding apparatus may measure a degree of distortion by accumulating differential values between samples according to phases of the reconstructed block of the target block and the reference block and use these as cost functions, and then, detect a specific reference block of the reconstructed block. The encoding apparatus may generate the modified motion information based on the detected specific reference block. In other words, the encoding apparatus may generate the modified motion information including the modified reference picture index indicating the specific reference index and the modified motion vector indicating the specific reference block in the specific reference picture. The encoding apparatus may detect the reference block of which summation of the absolute values (or square values) of the differentials between samples according to the phase of the reconstructed block of the target block among the reference blocks in the specific reference picture as the specific reference block and derive the modified motion information based on the specific reference block. As a method for representing the summation of the absolute values of the differentials, the sum of absolute differences (SAD) may be used. In this case, the summation of the absolute values of the differentials may be calculated by using Equation 1 described above. In addition, as a method for representing the summation of the absolute values of the differentials, the mean squared error (MSE) may be used. In this case, the summation of the absolute values of the differentials may be calculated by using Equation 2 described above.

In addition, the specific reference picture for the modified motion information may be derived as the reference picture indicated by the reference picture index included in the (first) motion information, and the search area for detecting the specific reference block may be limited to the reference blocks located in a predetermined area from the reference block derived in the reference picture based on the motion vector related to the reference picture included in the (first) motion information. That is, the encoding apparatus may derive the reference block of which SAD from the reconstructed block is the minimum among the reference blocks located in a predetermined area from the reference block derived in the reference picture as the specific reference block based on the motion vector related to the reference picture included in the (first) motion information.

In addition, in the case that a size of the reconstructed block is greater than a predetermined size, the reconstructed block may be partitioned into a plurality of sub reconstructed blocks, and a specific sub reconstructed block may be derived in a unit of sub reconstructed block in the specific reference picture. In this case, the encoding apparatus may derive the specific reference block based on the derived specific sub reconstructed blocks.

As another example, the encoding apparatus may generate the modified motion information through the OF method. In this case, the encoding apparatus may calculate the motion vector for the modified motion information of the target block based on an assumption that a velocity of an object in the target block is uniform and sample values of the samples representing the object is not changed in an image. The motion vector may be calculated through Equation 6 described above. The area of the samples indicating the object included in the target block may be configured as an area of 3×3 size.

In the case of calculating the modified motion information through the methods described above, the encoding apparatus may calculate the modified motion information so as to have the same format as the (first) motion information. That is, the encoding apparatus may calculate the modified motion information so as to have the same format as the motion information between the bi-prediction motion information and the uni-prediction motion information. The bi-prediction motion information may include L0 reference picture index and L0 motion vector, and L1 reference picture index and L1 motion vector, and the uni-directional motion information may include L0 reference picture index and L0 motion vector or L1 reference picture index and L1 motion vector. The L0 indicates reference picture list L0 (list 0) and the L1 indicates reference picture list L1 (list 1).

In addition, the bi-prediction is available to be performed in the target picture in which the target block is included, the encoding apparatus may calculate the modified motion information as the bi-prediction motion information through the method described above. However, after the modified motion information is calculated as the bi-prediction motion information, in the case that an occlusion occurs on one of the specific reference blocks derived by the bi-prediction motion information, the encoding apparatus may derive the modified motion information as the uni-prediction motion information except the motion information for the reference picture list of the specific reference picture in which the specific reference block is included in which the occlusion occurs. Whether the occlusion is occurred may be determined to be occurred when the differential value between the samples according to the phase of the reference block derived based on the modified motion information and the reconstructed block of the target block is greater than a specific threshold value. The threshold value may be pre-configured.

For example, the encoding apparatus calculates the modified motion information as the bi-prediction motion information, and in the case that the differential value between the samples according to the phase of the specific reference block derived based on L0 motion vector and L0 reference picture index of the modified motion information and the reconstructed block of the target block is greater than the preconfigured threshold value, the encoding apparatus may derive the modified motion information as the uni-prediction motion information including L1 motion vector and L1 reference picture index.

For another example, the encoding apparatus calculates the modified motion information as the bi-prediction motion information, and in the case that the differential value between the samples according to the phase of the specific reference block derived based on L1 motion vector and L1 reference picture index of the modified motion information and the reconstructed block of the target block is greater than the preconfigured threshold value, the encoding apparatus may derive the modified motion information as the uni-prediction motion information including L0 motion vector and L0 reference picture index.

In addition, in the case that the differential value between the samples according to the phase of the specific reference block derived based on L0 motion vector and L0 reference picture index and the reconstructed block of the target block is greater than the preconfigured threshold value and in the case that the differential value between the samples according to the phase of the specific reference block derived based on L1 motion vector and L1 reference picture index and the reconstructed block of the target block is greater than the preconfigured threshold value, the encoding apparatus may derive the motion information of the neighboring block of the target block as the modified motion information or may not calculate the modified motion information.

Meanwhile, the encoding apparatus may select the specific reference picture indicated by the modified reference picture index included in the modified motion information through various methods.

For example, the encoding apparatus may select the reference picture which is the most recently encoded among the reference pictures included in the reference picture list L0 and generate the modified L0 reference picture index indicating the reference picture. In addition, the encoding apparatus may select the reference picture which is the most recently encoded among the reference pictures included in the reference picture list L1 and generate the modified L1 reference picture index indicating the reference picture.

For another example, the encoding apparatus may select the reference picture having a POC of which an absolute value of a difference from a picture order count (POC) of the target picture among the reference pictures included in the L0 reference picture index and generate the modified L0 reference picture index indicating the reference picture. In addition, the encoding apparatus may select the reference picture having a POC of which an absolute value of a difference from a picture order count (POC) of the target picture among the reference pictures included in the L1 reference picture index and generate the modified L1 reference picture index indicating the reference picture.

For another example, the encoding apparatus may select the reference picture that belongs to the lowest layer on the hierarchical structure among the reference pictures included in each of the reference picture lists and generate the modified reference picture index indicating the reference picture. The reference picture that belongs to the lowest layer may be I-slice or a reference picture which is encoded by applying a low quantization parameter (QP).

For another example, the encoding apparatus may select the reference picture including a reference block of which reliability of the motion compensation is the highest in the reference picture list and generate the modified reference picture index indicating the reference picture. In other words, the encoding apparatus may derive the specific reference block of the reconstructed block of the target block based on the reference pictures included in the reference picture list and generate the modified reference picture index indicating the specific reference picture including the derived specific reference block.

The methods of generating the modified reference picture index of the modified motion information described above may be independently applied or the methods may be applied in combination.

In addition, although it is not shown, the encoding apparatus may generate the modified motion information of the target block based on the original block of the target block. The encoding apparatus may derive the specific reference block of the original block among the reference blocks included in the reference pictures and generate the modified motion information indicating the derived specific reference block.

The encoding apparatus updates the motion information of the target block based on the modified motion information (step, S1240). The encoding apparatus may store the modified motion information and update the motion information of the target block. The encoding apparatus may update the motion information of the target block by substituting the motion information used in predicting the target block to the modified motion information. In addition, the encoding apparatus may update the motion information of the target block by storing all the motion information and the modified motion information used in predicting the target block. The updated motion information may be used for the motion information of the next block neighboring the target block. For example, the merge mode is applied to the next block neighboring the target block, the merge candidate list of the next block may include the target block. In the case that the motion information of the target block is stored by substituting the motion information used in predicting the target block to the modified motion information, the merge candidate list of the next block may include the target block indicating the modified motion information. In addition, all the motion information and the modified motion information used in predicting the target block are stored in the motion information of the target block, the merge candidate list of the next block may include the target block indicating the motion information used in predicting the target block and the target block indicating the modified motion information. The target block indicating the modified motion information may be inserted as the spatial neighboring candidate block in the merge candidate list or inserted as the temporal neighboring candidate block in the merge candidate list.

For another example, the AMVP mode is applied to the next block neighboring the target block, like the method of inserting the updated motion information of the target block neighboring the next block in the merge candidate list in the merge mode described above as the spatial or temporal neighboring motion information, the method of inserting the updated motion information of the neighboring block in the motion vector predictor candidate list in the next block above as the spatial or temporal motion vector predictor candidate may be applied. That is, the encoding apparatus may generate the motion vector predictor candidate list including the updated motion information of the target block neighboring the next block.

For example, in the case that the updated motion information of the target block neighboring the next block includes only the modified motion information, the motion vector predictor candidate list may include the modified motion information as the spatial motion vector predictor candidate.

For another example, in the case that the updated motion information of the target block neighboring the next block includes the modified motion information and the existing motion information of the target block, the motion vector predictor candidate list may include the modified motion information selected according to a specific condition among the existing motion information selected according to a specific condition and the modified motion information of the target blocks neighboring the next block among the existing motion information of the target block neighboring the next block as the respective spatial motion vector predictor candidate.

Meanwhile, the motion vector predictor candidate list of the next block may include the updated motion information of the collocated block of the same position as the position of the next block and the updated motion information of the neighboring block of the same position block as the temporal motion vector predictor candidate list in the reference picture of the next block. For example, in the case that the updated motion information of the collocated block of the same position as the position of the next block and the updated motion information of the neighboring block of the same position block include only the modified motion information of each block, the motion vector predictor candidate list may include the modified motion information as the temporal motion vector predictor candidate list.

For another example, in the case that the updated motion information includes the same position block, the respective modified motion information of the neighboring block of the same position block and the existing motion information of the same position block, the motion vector predictor candidate list may include the modified motion information selected according to the specific condition among the existing motion information selected according to the specific condition and the modified motion information among the existing motion information as separate spatial motion vector predictor candidate, respectively.

Meanwhile, the stored motion information and the motion information for transmission may have different resolution. For example, the encoding apparatus encodes and transmits the information for the motion information and the modified motion information is stored for the motion information neighboring the target block, the unit of motion vector included in the motion information may have a unit of ¼ fractional sample and the unit of motion vector of the modified motion information may represent a unit of ⅛ fractional sample or ⅟16 fractional sample.

Meanwhile, although it is not shown, the encoding apparatus may determine whether to update the (first) motion information of the target block by performing the comparison procedure between the (first) motion information and the modified motion information based on the reconstructed block of the target block. For example, the encoding apparatus may determine whether to update the target block by comparing the amount of data of the residual signal of the specific reference block derived based on the modified motion information and the reconstructed block of the target block with the amount of data of the residual signal of the reference block derived based on the motion information and the reconstructed block. Among the amounts of data, in the case that the amount of data of the residual signal of the specific reference block and the reconstructed block is smaller, the encoding apparatus may determine to update the motion information and the target block. In addition, among the amounts of data, in the case that the amount of data of the residual signal of the specific reference block and the reconstructed block is not smaller, the encoding apparatus may determine not to update the motion information and the target block.

In addition, the encoding apparatus may determine whether to update the (first) motion information of the target block by performing the comparison procedure between the motion information and the modified motion information based on the original block of the target block. For example, the encoding apparatus may determine whether to update the target block by comparing the amount of data of the residual signal of the specific reference block derived based on the modified motion information and the original block of the target block with the amount of data of the residual signal of the reference block derived based on the motion information and the original block. Among the amounts of data, in the case that the amount of data of the residual signal of the specific reference block and the original block is smaller, the encoding apparatus may determine to update the motion information and the target block. In addition, among the amounts of data, in the case that the amount of data of the residual signal of the specific reference block and the original block is not smaller, the encoding apparatus may determine not to update the motion information and the target block.

Meanwhile, the encoding apparatus may generate and encode the additional information indicating whether to update and output it through bitstream. For example, the additional information indicating whether to update may be referred as an update flag. The case that the update block is 1 may indicate that the motion information is updated and the case that the update block is 0 may indicate that the motion information is not updated. For example, the update flag may be transmitted in a unit of PU. Alternatively, the update flag may be transmitted in a unit of CU, a unit of CTU or a unit of slice and may be transmitted through a higher level such as a unit of picture parameter set (PPS) or a unit of sequence parameter set (SPS).

Meanwhile, the encoding apparatus may further generate motion vector update differential information that indicates differential between the existing motion vector and the modified motion information and encode and output it. The motion vector update differential information may be transmitted in the unit of PU.

Although it is not shown, the encoding apparatus may encode and output the information on the residual sample for the target block. The information on the residual sample may include transform coefficients for the residual sample.

Figure 13:
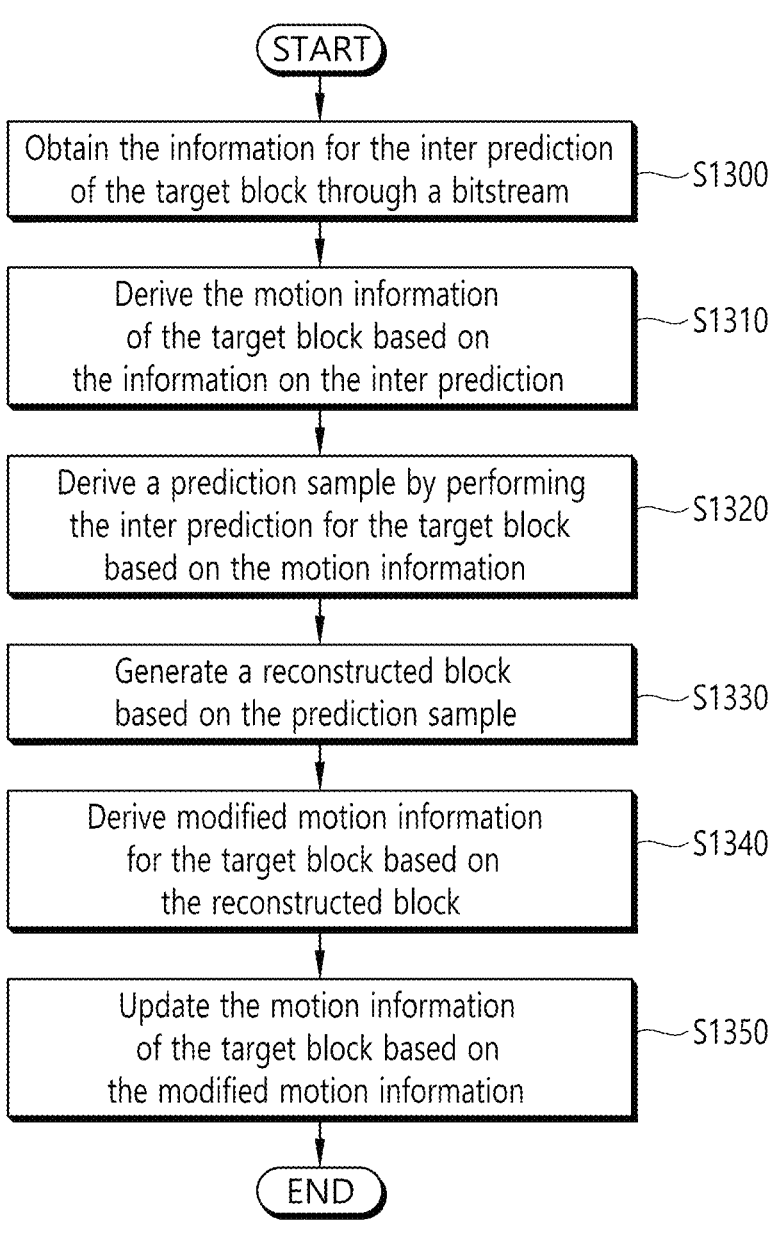
FIG. 13 schematically illustrates a video decoding method by a decoding apparatus according to the present invention.

FIG. 13 schematically illustrates a video decoding method by a decoding apparatus according to the present invention. The method shown in FIG. 13 may be performed by the decoding apparatus shown in FIG. 2. In a detailed example, step S1300 of FIG. 13 may be performed by an entropy decoding unit of the decoding apparatus, steps S1310 to S1340 may be performed by a prediction unit of the decoding apparatus and step S1350 may be performed by a memory of the decoding apparatus.

The decoding apparatus obtains the information for the inter prediction of the target block through a bitstream (step, S1300). The inter prediction or an intra prediction may be applied to the target block. In the case that the inter prediction is applied to the target block, the decoding apparatus may obtain the information for the inter prediction of the target block through the bitstream. In addition, the decoding apparatus may obtain the motion vector update differential information that indicates differential between the existing motion vector of the target block and the modified motion information through the bitstream. Furthermore, the decoding apparatus may obtain addition information whether to update the target block through the bitstream. For example, the addition information indicating whether to update may be referred to as an update flag.

The decoding apparatus derives the motion information of the target block based on the information on the inter prediction (step, S1310). The motion information may be referred to as first motion information. The information on the inter prediction may represent a mode which is applied to the target block among the skip mode, the merge mode and the adaptive motion vector prediction (AMVP) mode. In the case that the skip mode or the merge mode is applied to the target block, the decoding apparatus may generate the merge candidate list including neighboring blocks of the target block and obtain a merge index indicating a neighboring block among the neighboring blocks included in the merge candidate list. The merge index may be included in the information on the inter prediction. The decoding apparatus may derive the motion information of the neighboring block indicated by the merge index as the motion information of the target block.

In the case that the AMVP mode is applied to the target block, the decoding apparatus may generate a list based on the neighboring blocks of the target block like in the merge mode. The decoding apparatus may generate the index indicating a neighboring block among the neighboring blocks included in the generated list and a motion vector difference (MVD) between the motion vector of the neighboring block indicated by the index and the motion vector of the target block. The index and the MVD may be included in the information on the inter prediction. The decoding apparatus may generate the motion information of the target block based on the motion vector of the neighboring block indicated by the index and the MVD.

The motion information may include a motion vector and a reference picture index. The motion information may be bi-prediction motion information or uni-prediction motion information. The bi-prediction motion information may include L0 reference picture index and L0 motion vector, and L1 reference picture index and L1 motion vector, and the uni-directional motion information may include L0 reference picture index and L0 motion vector or L1 reference picture index and L1 motion vector. The L0 indicates reference picture list L0 (list 0) and the L1 indicates reference picture list L1 (list 1).

The decoding apparatus derives a prediction sample by performing the inter prediction for the target block based on the motion information (step, S1320). The decoding apparatus may generate the prediction sample of the target block based on the reference picture index and the motion vector included in the motion information.

The decoding apparatus generates a reconstructed block based on the prediction sample (step, S1330). In the case that the skip mode is applied to the target block, the decoding apparatus may generate the reconstructed block of the target block based on the prediction sample. In the case that the merge mode or the AMVP mode is applied to the target block, the decoding apparatus may generate a residual signal of the target block through the bitstream and generate the reconstructed block of the target block based on the residual signal and the prediction sample.

The encoding apparatus derives modified motion information for the target block based on the reconstructed block (step, S1340). The decoding apparatus may calculate the modified reference picture index indicating a specific reference picture for the modified motion information and a modified motion vector for the specific reference picture through various methods. The modified motion information may be referred to as second motion information. At least one method including direct methods such as an optical flow (OF) method, a block-matching method, a frequency domain method, and the like and indirect methods such as a singularity matching method, a method using a statistical property, and the like may be applied to the method. In addition, the direct methods and the indirect methods may be applied simultaneously.

For example, the decoding apparatus may generate the modified motion information through the block matching method. In this case, the decoding apparatus may measure a degree of distortion by accumulating differential values between samples according to phases of the reconstructed block of the target block and the reference block and use these as cost functions, and then, detect a specific reference block of the reconstructed block. The decoding apparatus may generate the modified motion information based on the detected specific reference block. In other words, the decoding apparatus may generate the modified motion information including the modified reference picture index indicating the specific reference index and the modified motion vector indicating the specific reference block in the specific reference picture. The decoding apparatus may detect the reference block of which summation of the absolute values (or square values) of the differentials between samples according to the phase of the reconstructed block of the target block among the reference blocks in the specific reference picture as the specific reference block and derive the modified motion information based on the specific reference block. As a method for representing the summation of the absolute values of the differentials, the sum of absolute differences (SAD) may be used. In this case, the summation of the absolute values of the differentials may be calculated by using Equation 1 described above. In addition, as a method for representing the summation of the absolute values of the differentials, the mean squared error (MSE) may be used. In this case, the summation of the absolute values of the differentials may be calculated by using Equation 2 described above.

In addition, the specific reference picture for the modified motion information may be derived as the reference picture indicated by the reference picture index included in the (first) motion information, and the search area for detecting the specific reference block may be limited to the reference blocks located in a predetermined area from the reference block derived in the specific reference picture based on the motion vector related to the reference picture included in the (first) motion information. That is, the decoding apparatus may derive the reference block of which SAD from the reconstructed block is the minimum among the reference blocks located in a predetermined area from the reference block derived in the specific reference picture as the specific reference block based on the motion vector related to the reference picture included in the motion information.

In addition, in the case that a size of the reconstructed block is greater than a predetermined size, the reconstructed block may be partitioned into a plurality of sub reconstructed blocks, and a specific sub reconstructed block may be derived in a unit of sub reconstructed block in the specific reference picture. In this case, the decoding apparatus may derive the specific reference block based on the derived specific sub reconstructed blocks.

As another example, the decoding apparatus may generate the modified motion information through the OF method. In this case, the decoding apparatus may calculate the modified motion vector for the modified motion information of the target block based on an assumption that a velocity of an object in the target block is uniform and sample values of the samples representing the object is not changed in an image. The motion vector may be calculated through Equation 6 described above. The area of the samples indicating the object included in the target block may be configured as an area of 3×3 size.

In the case of calculating the modified motion information through the methods described above, the decoding apparatus may calculate the modified motion information so as to have the same format as the (first) motion information. That is, the decoding apparatus may calculate the modified motion information so as to have the same format as the motion information between the bi-prediction motion information and the uni-prediction motion information. The bi-prediction motion information may include L0 reference picture index and L0 motion vector, and L1 reference picture index and L1 motion vector, and the uni-directional motion information may include L0 reference picture index and L0 motion vector or L1 reference picture index and L1 motion vector. The L0 indicates reference picture list L0 (list 0) and the L1 indicates reference picture list L1 (list 1).

In addition, the bi-prediction is available to be performed in the target picture in which the target block is included, the decoding apparatus may calculate the modified motion information as the bi-prediction motion information through the method described above. However, after the modified motion information is calculated as the bi-prediction motion information, in the case that an occlusion occurs on one of the reference blocks derived by the bi-prediction motion information, the decoding apparatus may derive the modified motion information as the uni-prediction motion information except the motion information for the reference picture list of the specific reference picture in which the specific reference block is included in which the occlusion occurs. Whether the occlusion is occurred may be determined to be occurred when the differential value between the samples according to the phase of the specific reference block derived based on the modified motion information and the reconstructed block of the target block is greater than a specific threshold value. The threshold value may be preconfigured.

For example, the decoding apparatus calculates the modified motion information as the bi-prediction motion information, and in the case that the differential value between the samples according to the phase of the specific reference block derived based on L0 motion vector and L0 reference picture index of the modified motion information and the reconstructed block of the target block is greater than the preconfigured threshold value, the encoding apparatus may derive the modified motion information as the uni-prediction motion information including L1 motion vector and L1 reference picture index.

For another example, the decoding apparatus calculates the modified motion information as the bi-prediction motion information, and in the case that the differential value between the samples according to the phase of the specific reference block derived based on L1 motion vector and L1 reference picture index of the modified motion information and the reconstructed block of the target block is greater than the preconfigured threshold value, the decoding apparatus may derive the modified motion information as the uni-prediction motion information including L0 motion vector and L0 reference picture index.

In addition, in the case that the differential value between the samples according to the phase of the specific reference block derived based on L0 motion vector and L0 reference picture index and the reconstructed block of the target block is greater than the preconfigured threshold value and in the case that the differential value between the samples according to the phase of the specific reference block derived based on L1 motion vector and L1 reference picture index and the reconstructed block of the target block is greater than the preconfigured threshold value, the decoding apparatus may derive the motion information of the neighboring block of the target block as the modified motion information or may not calculate the modified motion information.

Meanwhile, the decoding apparatus may select the specific reference picture indicated by the modified reference picture index included in the modified motion information through various methods.

For example, the decoding apparatus may select the reference picture which is the most recently encoded among the reference pictures included in the reference picture list L0 and generate the modified L0 reference picture index indicating the reference picture. In addition, the decoding apparatus may select the reference picture which is the most recently encoded among the reference pictures included in the reference picture list L1 and generate the modified L1 reference picture index indicating the reference picture.

For another example, the decoding apparatus may select the reference picture having a POC of which an absolute value of a difference from a picture order count (POC) of the target picture among the reference pictures included in the L0 reference picture index and generate the modified L0 reference picture index indicating the reference picture. In addition, the decoding apparatus may select the reference picture having a POC of which an absolute value of a difference from a picture order count (POC) of the target picture among the reference pictures included in the L1 reference picture index and generate the modified L1 reference picture index indicating the reference picture.

For another example, the decoding apparatus may select the reference picture that belongs to the lowest layer on the hierarchical structure among the reference pictures included in each of the reference picture lists and generate the modified reference picture index indicating the reference picture. The reference picture that belongs to the lowest layer may be I-slice or a reference picture which is encoded by applying a low quantization parameter (QP).

For another example, the decoding apparatus may select the reference picture including a reference block of which reliability of the motion compensation is the highest in the reference picture list and generate the modified reference picture index indicating the reference picture. In other words, the decoding apparatus may derive the specific reference block of the reconstructed block of the target block based on the reference pictures included in the reference picture list and generate the modified reference picture index indicating the specific reference picture including the derived specific reference block.

The methods of generating the modified reference picture index of the modified motion information described above may be independently applied or the methods may be applied in combination.

Meanwhile, the decoding apparatus may obtain the motion vector update differential information indicating a differential between the existing motion vector of the target block and the modified motion vector through the bitstream. In this case, the decoding apparatus may derive the modified motion information by summing the (first) motion information of the target block and the motion vector update differential information. The motion vector update differential information may be transmitted in a unit of PU described above.

The decoding apparatus updates the motion information of the target block based on the modified motion information (step, S1350). The decoding apparatus may store the modified motion information and update the motion information of the target block. The decoding apparatus may update the motion information of the target block by substituting the motion information used in predicting the target block to the modified motion information. In addition, the decoding apparatus may update the motion information of the target block by storing all the motion information and the modified motion information used in predicting the target block. The updated motion information may be used for the motion information of the next block neighboring the target block.

For example, the merge mode is applied to the next block neighboring the target block, the merge candidate list of the next block may include the target block. In the case that the motion information of the target block is stored by substituting the motion information used in predicting the target block to the modified motion information, the merge candidate list of the next block may include the target block indicating the modified motion information. In addition, all the motion information and the modified motion information used in predicting the target block are stored in the motion information of the target block, the merge candidate list of the next block may include the target block indicating the motion information used in predicting the target block and the target block indicating the modified motion information. The target block indicating the modified motion information may be inserted as the spatial neighboring candidate block in the merge candidate list or inserted as the temporal neighboring candidate block in the merge candidate list.

For another example, the AMVP mode is applied to the next block neighboring the target block, like the method of inserting the updated motion information of the target block neighboring the next block in the merge candidate list in the merge mode described above as the spatial or temporal neighboring motion information, the method of inserting the updated motion information of the neighboring block in the motion vector predictor candidate list in the next block above as the spatial or temporal motion vector predictor candidate may be applied. That is, the decoding apparatus may generate the motion vector predictor candidate list including the updated motion information of the target block neighboring the next block.

For example, in the case that the updated motion information of the target block neighboring the next block includes only the modified motion information, the motion vector predictor candidate list may include the modified motion information as the spatial motion vector predictor candidate.

For another example, in the case that the updated motion information of the target block neighboring the next block includes the modified motion information and the existing motion information of the target block, the motion vector predictor candidate list may include the modified motion information selected according to a specific condition among the existing motion information selected according to a specific condition and the modified motion information of the target blocks neighboring the next block among the existing motion information of the target block neighboring the next block as the respective spatial motion vector predictor candidate.

Meanwhile, the motion vector predictor candidate list of the next block may include the updated motion information of the collocated block of the same position as the position of the next block and the updated motion information of the neighboring block of the same position block as the temporal motion vector predictor candidate list in the reference picture of the next block. For example, in the case that the updated motion information of the collocated block of the same position as the position of the next block and the updated motion information of the neighboring block of the same position block include only the modified motion information of each block, the motion vector predictor candidate list may include the modified motion information as the temporal motion vector predictor candidate list.

For another example, in the case that the updated motion information includes the same position block, the respective modified motion information of the neighboring block of the same position block and the existing motion information of the same position block, the motion vector predictor candidate list may include the modified motion information selected according to the specific condition among the existing motion information selected according to the specific condition and the modified motion information among the existing motion information as separate spatial motion vector predictor candidate, respectively.

Meanwhile, the stored motion information and the motion information for transmission may have different resolution. For example, the decoding apparatus decodes and transmits the information for the motion information and the modified motion information is stored for the motion information neighboring the target block, the unit of motion vector included in the motion information may have a unit of ¼ fractional sample and the unit of motion vector of the modified motion information may represent a unit of ⅛ fractional sample or 1/16 fractional sample.

Meanwhile, although it is not shown, the decoding apparatus may determine whether to update the (first) motion information of the target block by performing the comparison procedure between the (first) motion information and the modified motion information based on the reconstructed block of the target block. For example, the decoding apparatus may determine whether to update the target block by comparing the amount of data of the residual signal of the specific reference block derived based on the modified motion information and the reconstructed block of the target block with the amount of data of the residual signal of the reference block derived based on the motion information and the reconstructed block. Among the amounts of data, in the case that the amount of data of the residual signal of the specific reference block and the reconstructed block is smaller, the decoding apparatus may determine to update the motion information and the target block. In addition, among the amounts of data, in the case that the amount of data of the residual signal of the specific reference block and the reconstructed block is not smaller, the decoding apparatus may determine not to update the motion information and the target block.

Meanwhile, the decoding apparatus may obtain the additional information indicating whether to update the target block through the bitstream. For example, the additional information indicating whether to update may be referred as an update flag. The case that the update block is 1 may indicate that the motion information is updated and the case that the update block is 0 may indicate that the motion information is not updated. For example, the update flag may be transmitted in a unit of PU. Alternatively, the update flag may be transmitted in a unit of CU, a unit of CTU or a unit of slice and may be transmitted through a higher level such as a unit of picture parameter set (PPS) or a unit of sequence parameter set (SPS).

According to the present invention described above, after decoding procedure of a target block, modified motion information of the target block is calculated, and can be updated to more accurate motion information, and through this, overall coding efficiency can be improved.

In addition, according to the present invention, motion information of a next block neighboring the target block can be derived based on the updated motion information of the target block, and propagation of distortion can be decreased, and through this, overall coding efficiency can be improved.

In the above-described embodiments, methods are described based on a flowchart as a series of steps or blocks. However, the present disclosure is not limited to the order of steps s. Some steps may occur simultaneously or in a different order than the order of the steps described above. Further, those skilled in the art will appreciate that the step shown in the flowchart is not exclusive. It will be understood that other steps may be included or that one or more steps in the flowchart may be deleted without affecting the scope of the present disclosure.

The method according to the present disclosure described above may be implemented in software. The encoding device and/or decoding device according to the present disclosure may be included in a device that performs image processing, for example, for a TV, a computer, a smart phone, a set-top box, or a display device.

When the embodiments of the present disclosure are implemented in software, the above-described method may be implemented by modules (processes, functions, and so on) that perform the functions described above. Such modules may be stored in memory and executed by a processor. The memory may be internal or external to the processor, and the memory may be coupled to the processor using various well known means. The processor may comprise an application-specific integrated circuit (ASIC), other chip-sets, a logic circuit and/or a data processing device. The memory may include a ROM (read-only memory), a RAM (random access memory), a flash memory, a memory card, a storage medium, and/or other storage device.

What is claimed is:

1. An image decoding method performed by a decoding apparatus, the method comprising:

obtaining information on an inter prediction mode for a first target block;

deriving motion information of the first target block based on the information on the inter prediction mode;

deriving modified motion information of the first target block by searching for position with a minimum sum of absolute differences (SAD) value within a predetermined area, based on the motion information of the first target block and bi-prediction;

configuring a merge candidate list for a second target block to which a merge mode is applied, based on a spatial neighboring block and a temporal neighboring block of the second target block;

obtaining a merge index and residual information for the second target block;

selecting one of merge candidates constituting the merge candidate list based on the merge index for the second target block;

deriving motion information of the second target block based on the selected merge candidate; and generating prediction samples for the second target block by performing an inter prediction based on the motion information of the second target block, generating residual samples for the second target block based on the residual information;

generating reconstructed samples for the second target block based on the prediction samples and the residual samples, wherein the merge candidates include a spatial motion information candidate and a temporal motion information candidate, wherein the spatial motion information candidate is derived based on the spatial neighboring block and the temporal motion information candidate is derived based on the temporal neighboring block, and wherein in a case where the spatial neighboring block is the first target block, the spatial motion information candidate is derived based on the motion information of the first target block rather than the modified motion information of the first target block, and in a case where the temporal neighboring block is the first target block, the temporal motion information candidate is derived based on the modified motion information of the first target block rather than the motion information of the first target block.

2. An image encoding method performed by an encoding apparatus, the method comprising:

determining that an inter prediction mode is applied to a first target block;

deriving motion information of the first target block based on the inter prediction mode;

deriving modified motion information of the first target block by searching for position with a minimum sum of absolute differences (SAD) value within a predetermined area based on the motion information of the first target block and bi-prediction;

configuring a merge candidate list for a second target block to which a merge mode is applied, based on a spatial neighboring block and a temporal neighboring block of the second target block;

selecting one of merge candidates constituting the merge candidate list;

generating merge index related to the selected merge candidate for the second target block;

deriving motion information of the second target block based on the selected merge candidate;

generating prediction samples for the second target block by performing the inter prediction based on the motion information of the second target block;

generating residual samples for the second target block based on the prediction samples for the second target block; and encoding image information including the merge index and residual information related to the residual samples, wherein the merge candidates include a spatial motion information candidate and a temporal motion information candidate, wherein the spatial motion information candidate is derived based on the spatial neighboring block and the temporal motion information candidate is derived based on the temporal neighboring block, and wherein in a case where the spatial neighboring block is the first target block, the spatial motion information candidate is derived based on the motion information of the first target block rather than the modified motion information of the first target block, and in a case where the temporal neighboring block is the first target block, the temporal motion information candidate is derived based on the modified motion information of the first target block rather than the motion information of the first target block.

3. A transmission method of data for an image, the method comprising:

obtaining a bitstream for the image, wherein the bitstream is generated based on determining that an inter prediction mode is applied to a first target block, deriving motion information of the first target block based on the inter prediction mode, deriving modified motion information of the first target block by searching for position with a minimum sum of absolute differences (SAD) value within a predetermined area based on the motion information of the first target block and bi-prediction, configuring a merge candidate list for a second target block to which a merge mode is applied, based on a spatial neighboring block and a temporal neighboring block of the second target block, selecting one of merge candidates constituting the merge candidate list, generating merge index related to the selected merge candidate for the second target block, deriving motion information of the second target block based on the selected merge candidate, generating prediction samples for the second target block by performing the inter prediction based on the motion information of the second target block, generating residual samples for the second target block based on the prediction samples for the second target block, and encoding image information including the merge index and residual information related to the residual samples, transmitting the data comprising the bitstream, wherein the merge candidates include a spatial motion information candidate and a temporal motion information candidate, wherein the spatial motion information candidate is derived based on the spatial neighboring block and the temporal motion information candidate is derived based on the temporal neighboring block, and wherein in a case where the spatial neighboring block is the first target block, the spatial motion information candidate is derived based on the motion information of the first target block rather than the modified motion information of the first target block, and in a case where the temporal neighboring block is the first target block, the temporal motion information candidate is derived based on the modified motion information of the first target block rather than the motion information of the first target block.

*    *    *    *    *